US010959434B2

(12) United States Patent
Jiang et al.

(10) Patent No.: US 10,959,434 B2
(45) Date of Patent: *Mar. 30, 2021

(54) ANTIMICROBIAL PHASE-SEPARABLE GLASS/POLYMER COMPOSITE ARTICLES AND METHODS FOR MAKING THE SAME

(71) Applicant: CORNING INCORPORATED, Corning, NY (US)

(72) Inventors: Dayue Jiang, Painted Post, NY (US); Kaitlyn Mary Matias, Somerville, MA (US); Kevin Andrew Vasilakos, Painted Post, NY (US); Jianguo Wang, Horseheads, NY (US); Jie Wang, Naperville, IL (US)

(73) Assignee: CORNING INCORPORATED, Corning, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 15/769,943

(22) PCT Filed: Oct. 20, 2016

(86) PCT No.: PCT/US2016/057804
§ 371 (c)(1),
(2) Date: Apr. 20, 2018

(87) PCT Pub. No.: WO2017/070280
PCT Pub. Date: Apr. 27, 2017

(65) Prior Publication Data
US 2018/0310568 A1    Nov. 1, 2018

Related U.S. Application Data

(60) Provisional application No. 62/244,368, filed on Oct. 21, 2015.

(51) Int. Cl.
*C03C 3/00* (2006.01)
*A01N 59/20* (2006.01)
(Continued)

(52) U.S. Cl.
CPC .............. *A01N 59/20* (2013.01); *A41D 31/30* (2019.02); *C03C 4/0035* (2013.01);
(Continued)

(58) Field of Classification Search
CPC .................................. A01N 59/20; C09D 7/61
See application file for complete search history.

(56) References Cited

U.S. PATENT DOCUMENTS 4,098,610 A    7/1978    Exell
5,470,373 A *  11/1995  Edelstein ............... H01B 1/026
                                                    75/255
(Continued)

FOREIGN PATENT DOCUMENTS

JP    53-145824 A    12/1978
JP    03-146436 A    6/1991
(Continued)

OTHER PUBLICATIONS

Peršin, Z., Zaplotnik, R. and Kleinschek, K.S., 2014. Ammonia plasma treatment as a method promoting simultaneous hydrophilicity and antimicrobial activity of viscose wound dressings. Textile Research Journal, 84(2), pp. 140-156. https://journals.sagepub.com/doi/pdf/10.1177/0040517513485631 (Year: 2014).*
(Continued)

*Primary Examiner* — Leith S Shafi
*Assistant Examiner* — Nicholas R Krasnow

(57) ABSTRACT

A method of making an antimicrobial composite article, including the steps: providing a matrix comprising a polymeric material; providing a plurality of second phase particles comprising an antimicrobial agent; melting the matrix
(Continued)

to form a matrix melt; distributing the plurality of second phase particles in the matrix melt at a second phase volume fraction to form a composite melt; forming a composite article from the composite melt; and treating the composite article to form an antimicrobial composite article having an exterior surface comprising an exposed portion of the matrix and the plurality of second phase particles. The distributing step can employ an extrusion process. The forming a composite article step can employ an injection molding process. The treating step can employ abrading and plasma-treating the article to define the exterior surface.

12 Claims, 10 Drawing Sheets

(51) Int. Cl.

| | | |
|---|---|---|
| C03C 4/00 | (2006.01) | |
| C08K 3/40 | (2006.01) | |
| C03C 14/00 | (2006.01) | |
| C08K 3/22 | (2006.01) | |
| C08K 13/02 | (2006.01) | |
| C09K 9/00 | (2006.01) | |
| C09D 7/61 | (2018.01) | |
| C09D 7/40 | (2018.01) | |
| C09D 5/14 | (2006.01) | |
| C09D 5/02 | (2006.01) | |
| C11D 3/48 | (2006.01) | |
| A41D 31/30 | (2019.01) | |
| C08K 3/015 | (2018.01) | |

(52) U.S. Cl.
CPC .......... *C03C 14/004* (2013.01); *C03C 14/006* (2013.01); *C08K 3/22* (2013.01); *C08K 3/40* (2013.01); *C08K 13/02* (2013.01); *C09D 5/025* (2013.01); *C09D 5/14* (2013.01); *C09D 7/61* (2018.01); *C09D 7/66* (2018.01); *C09K 9/00* (2013.01); *C11D 3/48* (2013.01); *C11D 3/485* (2013.01); *B01D 2239/0442* (2013.01); *B01D 2325/48* (2013.01); *C03C 2204/02* (2013.01); *C03C 2214/04* (2013.01); *C03C 2214/16* (2013.01); *C08K 3/015* (2018.01); *C08K 2003/2248* (2013.01)

(56) References Cited

U.S. PATENT DOCUMENTS

| | | | |
|---|---|---|---|
| 9,622,483 B2 * | 4/2017 | Bookbinder | ........... A01N 59/20 |
| 10,034,478 B2 * | 7/2018 | Krasnow | ................ A61K 33/34 |
| 2007/0122356 A1 | 5/2007 | Kessler et al. | |
| 2010/0196487 A1 * | 8/2010 | Voss | ........................ A01N 59/16 424/489 |
| 2014/0008324 A1 | 1/2014 | Appeaning et al. | |
| 2014/0079807 A1 | 3/2014 | Borrelli et al. | |
| 2014/0212467 A1 | 7/2014 | Chen et al. | |
| 2015/0225572 A1 | 8/2015 | Jiang et al. | |
| 2015/0230476 A1 | 8/2015 | Bookbinder et al. | |
| 2015/0320035 A1 | 11/2015 | Trinder, II et al. | |
| 2016/0205928 A1 * | 7/2016 | Appavoo | ............... A01N 25/26 |
| 2019/0029260 A1 * | 1/2019 | Jiang | ..................... A01N 25/34 |

FOREIGN PATENT DOCUMENTS

| | | | | |
|---|---|---|---|---|
| JP | 08-505858 A | | 6/1996 | |
| JP | 2003313050 A | * | 11/2003 | ............. C03C 3/097 |
| JP | 2006-520311 A | | 9/2006 | |
| JP | 2008-500980 A | | 1/2008 | |
| JP | 2009-297993 A | | 12/2009 | |
| JP | 2011-105587 A | | 6/2011 | |
| JP | 2014-527963 A | | 10/2014 | |
| JP | 2015-525840 A | | 9/2015 | |
| WO | 2012/135194 A1 | | 10/2012 | |
| WO | 2012/135294 A2 | | 10/2012 | |
| WO | 2014025949 A2 | | 2/2014 | |
| WO | 20170132179 A1 | | 8/2017 | |

OTHER PUBLICATIONS

Bookbinder et al; "Antimicrobial Glass Compositions, Glasses and Articles Incorporating the Same" Filed as U.S. Appl. No. 61/941,677 on Feb. 19, 2014.

Cioffi et al; "Copper Nanoparticle/Polymer Composites With Antifungal and Bacteriostatic Properties"; Chem. Mater. 2005, 17, pp. 5255-5262.

International Search Report and Written Opinion of the International Searching Authority; PCT/US2016/057804; dated Jan. 2, 2017; 11 Pages; European Patent Office.

Microguard™ Antimicrobial Copper Overview; PMX Industries, Inc.; 2 Pages; 2009.

United States Environmental Protection Agency, "Test Method for Efficacy of Copper Alloy Surfaces as a Sanitizer," 2009.

Zisman, W.A., "Relation of the Equilibrium Contact Angle to Liquid and Solid Constitution", Ch. 1 of Contact Angle, Wettability, and Adhesion, 1964, pp. 1-51, American Chemical Society, Washington, D.C.

Law, K.-Y., "Definitions for Hydrophilicity, Hydrophobicity, and Superhydrophobicity: Getting the Basics Right", J. of Phy. Chem. Lett., 2014, pp. 686-885, 5, ACS Publications.

Japanese Patent Application No. 2018-520520, Office Action dated Nov. 6, 2020, 10 pages (5 pages of English Translation and 5 pages of Original Document); Japanese Patent Office.

* cited by examiner

ANTIMICROBIAL PHASE-SEPARABLE GLASS/POLYMER COMPOSITE ARTICLES AND METHODS FOR MAKING THE SAME

CROSS-REFERENCE TO RELATED APPLICATIONS

This application is a national stage entry of International Patent Application Serial No. PCT/US2016/057804 filed on Oct. 20, 2016, which claims the benefit of priority under 35 U.S.C. § 119 of U.S. Provisional Application No. 62/244,368, filed Oct. 21, 2015, the content of which is incorporated herein by reference in its entirety.

BACKGROUND

The present disclosure relates generally to antimicrobial composite articles and methods for making them. More particularly, the various embodiments described herein relate to glass/polymer composite antimicrobial articles having copper-containing antimicrobial agents and various methods for making them.

Consumer electronics articles, including touch-activated or touch-interactive devices, such as screen surfaces (e.g., surfaces of electronic devices having user-interactive capabilities that are activated by touching specific portions of the surfaces), have become increasingly more prevalent. As the extent to which the touch screen-based interactions between a user and a device increases, so too does the likelihood of the surface harboring microorganisms (e.g., bacteria, fungi, viruses, and the like) that can be transferred from user to user. Moreover, the housings which incorporate the touch-activated or touch-interactive devices also include surfaces that harbor such microorganisms that can be transferred from user to user. The concern of microorganism transfer is also a concern with many "high touch" surfaces associated with various electronic equipment, furniture and architectural articles, counter-tops, table-tops, control panels and other articles used in medical, office and consumer settings in which users, consumers or the like come into contact with these surfaces.

To minimize the presence of microbes on various materials, so-called "antimicrobial" properties have been imparted to a variety of glasses; however, there is a need to provide entire articles (including the housing and any glasses used as cover glass) that also exhibit antimicrobial properties. Accordingly, antimicrobial articles useful for certain applications should be durable enough for the purpose for which they are used, while also providing continuous antimicrobial properties that are passive or do not require additional activation by a user or outside source (e.g., UV light). In addition, antimicrobial glasses and articles should provide controlled antimicrobial activity.

In some situations, polymer/glass composite articles intended to exhibit antimicrobial properties demonstrate far less antimicrobial efficacy. One problem associated with such articles is ensuring that the antimicrobial agents are present at the surfaces of these articles at a concentration sufficient to provide the desired antimicrobial efficacy. Another problem is ensuring that the microbes present on the surfaces of such article are in residence for a sufficient duration to be killed or neutralized by the antimicrobial agents within the composite articles.

Accordingly, there is a need for antimicrobial composites articles possessing exterior surfaces that can be configured to produce desired antimicrobial efficacy levels, along with processes for making the same.

SUMMARY

A first aspect of the present disclosure pertains to an antimicrobial composite article that includes: a matrix comprising a polymeric material; and a plurality of second phase particles comprising a phase-separable glass with a copper-containing antimicrobial agent. The plurality of particles is distributed within the matrix at a second phase volume fraction. Further, the composite article defines an exterior surface comprising an exposed portion of the matrix and the plurality of the second phase particles.

The second phase particles of the antimicrobial composite article in some aspects can include phase-separable glass that includes at least one of $B_2O_3$, $P_2O_5$ and $R_2O$, and the antimicrobial agent is cuprite which includes a plurality of $Cu^{1+}$ ions. In certain aspects, the plurality of second phase particles has a size distribution defined by a 325 standard US mesh size. Further, the phase-separable glass can comprise between about 10 and 50 mol % cuprite.

The matrix of the antimicrobial composite article in some aspects can include a polymeric material selected from the group consisting of a polypropylene, a polyolefin and a polysulfone. In certain aspects, the polymeric material can be characterized by substantial hydrophobicity, while the exposed portion of the matrix is characterized by substantial hydrophilicity. Other aspects of the antimicrobial composite article employ a matrix with a polymeric material characterized by substantial hydrophilicity (e.g., within its bulk and on its exposed surfaces and portions). In addition, the exposed portion of the matrix can comprise functional groups derived from a plasma treatment of the matrix.

In some implementations of the antimicrobial composite article, the exterior surface of the article exhibits at least a log 2 reduction in a concentration of at least one of *Staphylococcus aureus, Enterobacter aerogenes*, and *Pseudomonas aeruginosa* bacteria under modified United States Environmental Protection Agency "Test Method for Efficacy of Copper Alloy Surfaces as a Sanitizer" testing conditions, wherein the modified conditions include substitution of the antimicrobial composite article with the copper-containing surface prescribed in the Method and use of copper metal article as the prescribed control sample in the Method (collectively, the "Modified EPA Copper Test Protocol"). In certain aspects, the exterior surface can exhibit at least a log 3, log 4, or even a log 5, reduction of the same bacteria under the same Modified EPA Copper Test Protocol test conditions.

A second aspect of the disclosure pertains to a method of making an antimicrobial composite article, including the steps: providing a matrix comprising a polymeric material; providing a plurality of second phase particles comprising an antimicrobial agent; melting the matrix to form a matrix melt; distributing the plurality of second phase particles in the matrix melt at a second phase volume fraction to form a composite melt; forming a composite article from the composite melt; and treating the composite article to form an antimicrobial composite article having an exterior surface comprising an exposed portion of the matrix and the plurality of second phase particles.

The treating step of the method of making the antimicrobial composite article in some aspects can include abrading the composite article to form an antimicrobial composite article having an exterior surface comprising an exposed portion of the matrix and the plurality of second phase particles. The abrading can be conducted with hand sanding, grit blasting or other similar grinding and/or polishing techniques. In other aspects of the method, the treating step can include abrading and plasma-treating the composite article to form an antimicrobial composite article having an exterior surface comprising an exposed portion of the matrix and the plurality of second phase particles. In these implementations, the abrading can be performed before the plasma-treating or vice versa. Further, the plasma-treating can conducted with any of a variety of known processes that produce or otherwise create functional groups in the exposed portion of the matrix on the exterior surface of the article.

According to some aspects of the method, the melting and distributing steps can include or otherwise employ an extrusion process. Further, the forming a composite article step can include or otherwise employ an injection molding process. As such, the forming step can be employed to fashion the composite article in a final product form or a near net shape form.

A third aspect of the disclosure pertains to a method of making an antimicrobial composite article, including the steps: providing a matrix comprising a hydrophobic polymeric material; providing a plurality of second phase particles comprising a copper-containing antimicrobial agent; melting the matrix to form a matrix melt; extruding the plurality of second phase particles in the matrix melt at a second phase volume fraction to form a composite melt; injection molding a composite article from the composite melt; and treating the composite article to form an antimicrobial composite article having an exterior surface comprising an exposed portion of the matrix and the plurality of second phase particles. Further, the exposed portion of the plurality of second phase particles is distributed within the exposed portion of the matrix at a second phase area fraction within ±25% of the second phase volume fraction.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiment(s), examples of which are illustrated in the accompanying drawings.

Aspects of the disclosure generally pertain to antimicrobial composite articles that include secondary particles comprising glass compositions with antimicrobial properties.

The antimicrobial properties of the glasses disclosed herein include antiviral and/or antibacterial properties. As used herein the term "antimicrobial," means a material, or a surface of a material that will kill or inhibit the growth of bacteria, viruses and/or fungi. The term as used herein does not mean the material or the surface of the material will kill or inhibit the growth of all species microbes within such families, but that it will kill or inhibit the growth or one or more species of microbes from such families.

As used herein the term "log reduction" means —log $(C_d/C_0)$, where Ca=the colony form unit (CFU) number of the antimicrobial surface and $C_0$=the colony form unit (CFU) of the control surface that is not an antimicrobial surface. As an example, a "3 log" reduction equals about 99.9% of the bacteria, viruses and/or fungi killed. Similarly, a "5 log" reduction equals about 99.999% of bacteria, viruses and/or fungi killed.

Figure 1:
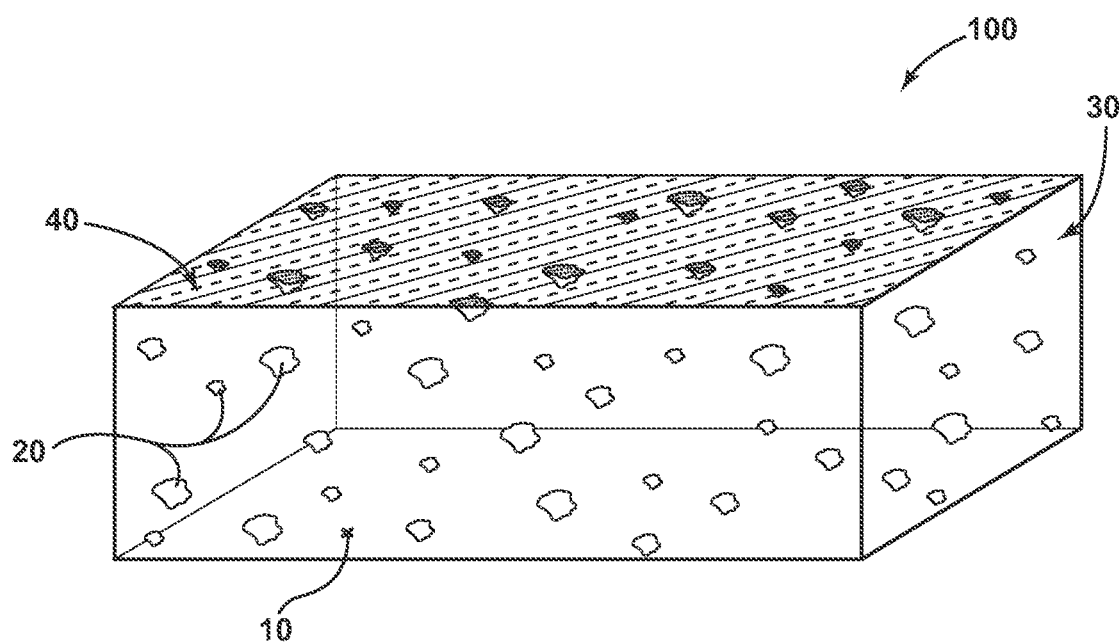
FIG. 1 is a schematic, perspective view of an antimicrobial composite article according to an aspect of the disclosure.

Referring to FIG. 1, an antimicrobial composite article 100 is provided in an exemplary, schematic form. The article 100 includes a matrix 10 that comprises a polymeric material. The article 100 also includes a plurality of second phase particles 20. The particles 20 comprise a phase-separable glass with a copper-containing antimicrobial agent. Further, the plurality of particles 20 is distributed within the matrix 10 at a second phase volume fraction. As also depicted in FIG. 1, the composite article 100 defines an exterior surface 40 that includes an exposed portion of the matrix 10 and the plurality of the second phase particles 20. The exposed portion of the exterior surface 40 is also depicted in the plan view of FIG. 1A. In certain implementations, other exterior surfaces 30 of the article 100 can also include such exposed portions.

Referring again to FIG. 1, the exposed portion of the exterior surface 40 can, at least in some aspects, contain a certain percentage of second phase particles 20 that have been bisected or are otherwise sectioned such that their interiors are exposed. In certain implementations, the exposed portion of the plurality of the second phase particles 20 can be distributed within the exposed portion of the matrix 10 at a second phase area fraction within ±25% of the second phase volume fraction. That is, the exposed portion of the exterior surface possesses roughly the same or similar percentage of second phase particles as the bulk of the antimicrobial composite article 100.

As outlined earlier, the second phase particles 20 include a phase-separable glass with a copper-containing antimicrobial agent. The phase-separable glass employed in the particles 20 is described in U.S. patent application Ser. No. 14/623,077, filed on Feb. 16, 2015, the salient portions of which related to phase-separable glass are hereby incorporated by reference within this disclosure. In one or more embodiments, the phase-separable glasses employed in the second phase particles 20 include a Cu species. In one or more alternative embodiments, the Cu species may include $Cu^{1+}$, $Cu^0$, and/or $Cu^{2+}$. The combined total of the Cu species may be about 10 wt % or more. However, as will be discussed in more detail below, the amount of $Cu^{2+}$ is minimized or is reduced such that the antimicrobial glass is substantially free of $Cu^{2+}$. The $Cu^{1+}$ ions may be present on or in the surface and/or the bulk of the antimicrobial glass. In some embodiments, the $Cu^{1+}$ ions are present in the glass network and/or the glass matrix of the antimicrobial glass. Where the $Cu^{1+}$ ions are present in the glass network, the $Cu^{1+}$ ions are atomically bonded to the atoms in the glass network. Where the $Cu^{1+}$ ions are present in the glass matrix, the $Cu^{1+}$ ions may be present in the form of $Cu^{1+}$ crystals that are dispersed in the glass matrix. In some embodiments the $Cu^{1+}$ crystals include cuprite ($Cu_2O$). In such embodiments, where $Cu^{1+}$ crystals are present, the material may be referred to as an antimicrobial glass ceramic, which is intended to refer to a specific type of glass with crystals that may or may not be subjected to a traditional ceramming process by which one or more crystalline phases are introduced and/or generated in the glass. Where the $Cu^{1+}$ ions are present in a non-crystalline form, the material may be referred to as an antimicrobial glass. In some embodiments, both $Cu^{1+}$ crystals and $Cu^{1+}$ ions not associated with a crystal are present in the antimicrobial glasses described herein.

In one or more aspects of the antimicrobial composite article 100, the antimicrobial glass employed in the second phase particles 20 may be formed from a composition that can include, in mole percent, $SiO_2$ in the range from about 40 to about 70, $Al_2O_3$ in the range from about 0 to about 20, a copper-containing oxide in the range from about 10 to about 30, CaO in the range from about 0 to about 15, MgO in the range from about 0 to about 15, $P_2O_5$ in the range from about 0 to about 25, $B_2O_3$ in the range from about 0 to about 25, $K_2O$ in the range from about 0 to about 20, ZnO in the range from about 0 to about 5, $Na_2O$ in the range from about 0 to about 20, and/or $Fe_2O_3$ in the range from about 0 to about 5. In such embodiments, the amount of the copper-containing oxide is greater than the amount of $Al_2O_3$. In some embodiments, the composition may include a content of $R_2O$, where R may include K, Na, Li, Rb, Cs and combinations thereof.

In the embodiments of the compositions described herein, $SiO_2$ serves as the primary glass-forming oxide. The amount of $SiO_2$ present in a composition should be enough to provide glasses that exhibit the requisite chemical durability suitable for its use or application within the antimicrobial composite article 100 (e.g., touch applications, article housing etc.). The upper limit of $SiO_2$ may be selected to control the melting temperature of the compositions described herein. For example, excess $SiO_2$ could drive the melting temperature at 200 poise to high temperatures at which defects such as fining bubbles may appear or be generated during processing and in the resulting glass. Furthermore, compared to most oxides, $SiO_2$ decreases the compressive stress created by an ion exchange process of the resulting glass. In other words, glass formed from compositions with excess $SiO_2$ may not be ion-exchangeable to the same degree as glass formed from compositions without excess $SiO_2$. Additionally or alternatively, $SiO_2$ present in the compositions according to one or more embodiments could increase the plastic deformation prior break properties of the resulting glass. An increased $SiO_2$ content in the glass formed from the compositions described herein may also increase the indentation fracture threshold of the glass.

In one or more aspects of the antimicrobial composite article 100, the composition of the glass employed in the second phase particles 20 includes $SiO_2$ in an amount, in mole percent, in the range from about 40 to about 70, from about 40 to about 69, from about 40 to about 68, from about 40 to about 67, from about 40 to about 66, from about 40 to about 65, from about 40 to about 64, from about 40 to about 63, from about 40 to about 62, from about 40 to about 61, from about 40 to about 60, from about 41 to about 70, from about 42 to about 70, from about 43 to about 70, from about 44 to about 70, from about 45 to about 70, from about 46 to about 70, from about 47 to about 70, from about 48 to about 70, from about 49 to about 70, from about 50 to about 70, from about 41 to about 69, from about 42 to about 68, from about 43 to about 67 from about 44 to about 66 from about 45 to about 65, from about 46 to about 64, from about 47 to about 63, from about 48 to about 62, from about 49 to about 61, from about 50 to about 60 and all ranges and sub-ranges therebetween.

In one or more aspects of the antimicrobial composite article 100, the composition of the glass employed in the second phase particles 20 includes $Al_2O_3$ an amount, in mole percent, in the range from about 0 to about 20, from about 0 to about 19, from about 0 to about 18, from about 0 to about 17, from about 0 to about 16, from about 0 to about 15, from about 0 to about 14, from about 0 to about 13, from about 0 to about 12, from about 0 to about 11 from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of $Al_2O_3$. As used herein, the phrase "substantially free" with respect to the components of the composition and/or resulting glass means that the component is not actively or intentionally added to the compositions during initial batching or subsequent post processing (e.g., ion exchange process), but may be present as an impurity. For example, a composition, a glass may be describe as being substantially free of a component, when the component is present in an amount of less than about 0.01 mol %.

The amount of $Al_2O_3$ may be adjusted to serve as a glass-forming oxide and/or to control the viscosity of molten compositions within the glass employed in the second phase particles 20. Without being bound by theory, it is believed that when the concentration of alkali oxide ($R_2O$) in a composition is equal to or greater than the concentration of $Al_2O_3$, the aluminum ions are found in tetrahedral coordination with the alkali ions acting as charge-balancers. This tetrahedral coordination greatly enhances various post-processing (e.g., ion exchange process) of glasses formed from such compositions. Divalent cation oxides (RO) can also charge balance tetrahedral aluminum to various extents. While elements such as calcium, zinc, strontium, and barium behave equivalently to two alkali ions, the high field strength of magnesium ions causes them to not fully charge balance aluminum in tetrahedral coordination, resulting in the formation of five- and six-fold coordinated aluminum. Generally, $Al_2O_3$ can play an important role in ion-exchangeable compositions and strengthened glasses since it enables a strong network backbone (i.e., high strain point) while allowing for the relatively fast diffusivity of alkali ions. However, when the concentration of $Al_2O_3$ is too high, the composition may exhibit lower liquidus viscosity and, thus, $Al_2O_3$ concentration may be controlled within a reasonable range. Moreover, as will be discussed in more detail below, excess $Al_2O_3$ has been found to promote the formation of $Cu^{2+}$ ions, instead of the desired $Cu^{1+}$ ions.

In one or more aspects of the antimicrobial composite article 100, the composition of the glass employed in the second phase particles 20 includes a copper-containing oxide in an amount, in mole percent, in the range from about 10 to about 50, from about 10 to about 49, from about 10 to about 48, from about 10 to about 47, from about 10 to about 46, from about 10 to about 45, from about 10 to about 44, from about 10 to about 43, from about 10 to about 42, from about 10 to about 41, from about 10 to about 40, from about 10 to about 39, from about 10 to about 38, from about 10 to about 37, from about 10 to about 36, from about 10 to about 35, from about 10 to about 34, from about 10 to about 33, from about 10 to about 32, from about 10 to about 31, from about 10 to about 30, from about 10 to about 29, from about 10 to about 28, from about 10 to about 27, from about 10 to about 26, from about 10 to about 25, from about 10 to about 24, from about 10 to about 23, from about 10 to about 22, from about 10 to about 21, from about 10 to about 20, from about 11 to about 50, from about 12 to about 50, from about 13 to about 50, from about 14 to about 50, from about 15 to about 50, from about 16 to about 50, from about 17 to about 50, from about 18 to about 50, from about 19 to about 50, from about 20 to about 50, from about 10 to about 30, from about 11 to about 29, from about 12 to about 28, from about 13 to about 27, from about 14 to about 26, from about 15 to about 25, from about 16 to about 24, from about 17 to about 23, from about 18 to about 22, from about 19 to about 21 and all ranges and sub-ranges therebetween. In one or more specific embodiments, the copper-containing oxide may be present in the composition in an amount of about 20 mole percent, about 25 mole percent, about 30 mole percent or about 35 mole percent. The copper-containing oxide may include CuO, $Cu_2O$ and/or combinations thereof.

The copper-containing oxides in the composition form the $Cu^{1+}$ ions present in the resulting glass. Copper may be present in the composition and/or the glasses including the composition in various forms including $Cu^0$, $Cu^{1+}$, and $Cu^{2+}$. Copper in the $Cu^0$ or $Cu^{1+}$ forms provide antimicrobial activity. However forming and maintaining these states of antimicrobial copper are difficult and often, in known compositions, $Cu^{2+}$ ions are formed instead of the desired Cu0 or $Cu^{1+}$ ions.

In one or more aspects of the antimicrobial composite article 100, the amount of copper-containing oxide in the glass of the second phase particles 20 is greater than the amount of $Al_2O_3$ in the composition. Without being bound by theory it is believed that an about equal amount of copper-containing oxides and $Al_2O_3$ in the composition results in the formation of tenorite (CuO) instead of cuprite ($Cu_2O$). The presence of tenorite decreases the amount of $Cu^{1+}$ in favor of $Cu^{2+}$ and thus leads to reduced antimicrobial activity. Moreover, when the amount of copper-containing oxides is about equal to the amount of $Al_2O_3$, aluminum prefers to be in a four-fold coordination and the copper in the composition and resulting glass remains in the $Cu^{2+}$ form so that the charge remains balanced. Where the amount of copper-containing oxide exceeds the amount of $Al_2O_3$, then it is believed that at least a portion of the copper is free to remain in the $Cu^{1+}$ state, instead of the $Cu^{2+}$ state, and thus the presence of $Cu^{1+}$ ions increases.

In one or more aspects of the antimicrobial composite article 100, the composition of one or more embodiments of the glass of the second phase particles 20 includes $P_2O_5$ in an amount, in mole percent, in the range from about 0 to about 25, from about 0 to about 22, from about 0 to about 20, from about 0 to about 18, from about 0 to about 16, from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition includes about 10 mole percent or about 5 mole percent $P_2O_5$ or, alternatively, may be substantially free of $P_2O_5$.

In one or more embodiments, $P_2O_5$ forms at least part of a less durable phase or a degradable phase in the glass employed in the second phase particles 20 of the antimicrobial composite article 100. The relationship between the degradable phase(s) of the glass and antimicrobial activity is discussed in greater detail herein. In one or more embodiments, the amount of $P_2O_5$ may be adjusted to control crystallization of the composition and/or glass during forming. For example, when the amount of $P_2O_5$ is limited to about 5 mol % or less or even 10 mol % or less, crystallization may be minimized or controlled to be uniform. However, in some embodiments, the amount or uniformity of crystallization of the composition and/or glass may not be of concern and thus, the amount of $P_2O_5$ utilized in the composition may be greater than 10 mol %.

In one or more embodiments, the amount of $P_2O_5$ in the composition may be adjusted based on the desired damage resistance of the glass employed in the second phase particles 20 of the antimicrobial composite article 100, despite the tendency for $P_2O_5$ to form a less durable phase or a degradable phase in the glass. Without being bound by theory, $P_2O_5$ can decrease the melting viscosity relative to $SiO_2$. In some instances, $P_2O_5$ is believed to help to suppress zircon breakdown viscosity (i.e., the viscosity at which zircon breaks down to form $ZrO_2$) and may be more effective in this regard than $SiO_2$. When glass is to be chemically strengthened via an ion exchange process, $P_2O_5$ can improve the diffusivity and decrease ion exchange times, when compared to other components that are sometimes characterized as network formers (e.g., $SiO_2$ and/or $B_2O_3$).

In one or more aspects of the antimicrobial composite article 100, the composition of one or more embodiments of the glass of the second phase particles 20 includes $B_2O_3$ in an amount, in mole percent, in the range from about 0 to about 25, from about 0 to about 22, from about 0 to about 20, from about 0 to about 18, from about 0 to about 16, from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition includes a non-zero amount of $B_2O_3$, which may be, for example, about 10 mole percent or about 5 mole percent. The composition of some embodiments may be substantially free of $B_2O_3$.

In one or more embodiments, $B_2O_3$ forms a less durable phase or a degradable phase in the glass employed in the second phase particles 20 of the antimicrobial composite article 100. The relationship between the degradable phase(s) of the glass and antimicrobial activity is discussed in greater detail herein. Without being bound by theory, it is believed the inclusion of $B_2O_3$ in compositions imparts damage resistance in glasses incorporating such compositions, despite the tendency for $B_2O_3$ to form a less durable phase or a degradable phase in the glass. The composition of one or more embodiments includes one or more alkali oxides ($R_2O$) (e.g., $Li_2O$, $Na_2O$, $K_2O$, $Rb_2O$ and/or $Cs_2O$). In some embodiments, the alkali oxides modify the melting temperature and/or liquidus temperatures of such compositions. In one or more embodiments, the amount of alkali oxides may be adjusted to provide a composition exhibiting a low melting temperature and/or a low liquidus temperature. Without being bound by theory, the addition of alkali oxide(s) may increase the coefficient of thermal expansion (CTE) and/or lower the chemical durability of the antimicrobial glasses that include such compositions. In some cases these attributes may be altered dramatically by the addition of alkali oxide(s).

In one or more aspects of the antimicrobial composite article 100, the composition of one or more embodiments of the glass of the second phase particles 20 may include one or more divalent cation oxides, such as alkaline earth oxides and/or ZnO. Such divalent cation oxides may be included to improve the melting behavior of the compositions.

In one or more aspects of the antimicrobial composite article 100, the composition of one or more embodiments of the glass of the second phase particles 20 may include CaO in an amount, in mole percent, in the range from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of CaO.

In one or more aspects of the antimicrobial composite article 100, the composition of one or more embodiments of the glass of the second phase particles 20 may include MgO in an amount, in mole percent, in the range from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of MgO.

In one or more aspects of the antimicrobial composite article 100, the composition of one or more embodiments of the glass of the second phase particles 20 may include ZnO in an amount, in mole percent, in the range from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of ZnO.

In one or more aspects of the antimicrobial composite article 100, the composition of one or more embodiments of the glass of the second phase particles 20 may include $Fe_2O_3$, in mole percent, in the range from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of $Fe_2O_3$.

In one or more aspects of the antimicrobial composite article 100, the composition of one or more embodiments of the glass of the second phase particles 20 may include one or more colorants. Examples of such colorants include NiO, $TiO_2$, $Fe_2O_3$, $Cr_2O_3$, $Co_3O_4$ and other known colorants. In some embodiments, the one or more colorants may be present in an amount in the range up to about 10 mol %. In some instances, the one or more colorants may be present in an amount in the range from about 0.01 mol % to about 10 mol %, from about 1 mol % to about 10 mol %, from about 2 mol % to about 10 mol %, from about 5 mol % to about 10 mol %, from about 0.01 mol % to about 8 mol %, or from about 0.01 mol % to about 5 mol %. In some aspects, the colorant employed in the second phase particles 20 is selected to match the color of the matrix employed in the antimicrobial composite article 100.

In one or more aspects of the antimicrobial composite article 100, the composition of one or more embodiments of the glass of the second phase particles 20 may include one or more nucleating agents. Exemplary nucleating agents include $TiO_2$, $ZrO_2$ and other known nucleating agents in the art. The composition can include one or more different nucleating agents. The nucleating agent content of the composition may be in the range from about 0.01 mol % to about 1 mol %. In some instances, the nucleating agent content may be in the range from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.05 mol % to about 1 mol %, from about 0.1 mol % to about 1 mol %, from about 0.2 mol % to about 1 mol %, from about 0.3 mol % to about 1 mol %, or from about 0.4 mol % to about 1 mol %, and all ranges and sub-ranges therebetween.

The glasses formed from the compositions, as employed in the second phase particles 20 of the antimicrobial composite article 100, may include a plurality of $Cu^{1+}$ ions. In some embodiments, such $Cu^{1+}$ ions form part of the glass network and may be characterized as a glass modifier. Without being bound by theory, where $Cu^{1+}$ ions are part of the glass network, it is believed that during typical glass formation processes, the cooling step of the molten glass occurs too rapidly to allow crystallization of the copper-containing oxide (e.g., CuO and/or $Cu_2O$). Thus the $Cu^{1+}$ remains in an amorphous state and becomes part of the glass network. In some cases, the total amount of $Cu^{1+}$ ions, whether they are in a crystalline phase or in the glass matrix, may be even higher, such as up to 40 mol %, up to 50 mol %, or up to 60 mol %.

In one or more embodiments, the glasses formed form the compositions disclosed herein, as employed in the second phase particles 20 of the antimicrobial composite article 100, include $Cu^{1+}$ ions that are dispersed in the glass matrix as $Cu^{1+}$ crystals. In one or more embodiments, the $Cu^{1+}$ crystals may be present in the form of cuprite. The cuprite present in the glass may form a phase that is distinct from the glass matrix or glass phase. In other embodiments, the cuprite may form part of or may be associated with one or more glasses phases (e.g., the durable phase described herein). The $Cu^{1+}$ crystals may have an average major dimension of about 5 micrometers (μm) or less, 4 micrometers (μm) or less, 3 micrometers (μm) or less, 2 micrometers (μm) or less, about 1.9 micrometers (μm) or less, about 1.8 micrometers (μm) or less, about 1.7 micrometers (μm) or less, about 1.6 micrometers (μm) or less, about 1.5 micrometers (μm) or less, about 1.4 micrometers (μm) or less, about 1.3 micrometers (μm) or less, about 1.2 micrometers (μm) or less, about 1.1 micrometers or less, 1 micrometers or less, about 0.9 micrometers (μm) or less, about 0.8 micrometers (μm) or less, about 0.7 micrometers (μm) or less, about 0.6 micrometers (μm) or less, about 0.5 micrometers (μm) or less, about 0.4 micrometers (μm) or less, about 0.3 micrometers (μm) or less, about 0.2 micrometers (μm) or less, about 0.1 micrometers (μm) or less, about 0.05 micrometers (μm) or less, and all ranges and sub-ranges therebetween. As used herein and with respect to the phrase "average major dimension", the word "average" refers to a mean value and the word "major dimension" is the greatest dimension of the particle as measured by scanning electron microscopy (SEM). In some embodiments, the cuprite phase may be present in the glass of the second phase particles 20 of the antimicrobial composite article 100 in an amount of at least about 10 wt %, at least about 15 wt %, at least about 20 wt %, at least about 25 wt % and all ranges and subranges therebetween of the antimicrobial glass. In certain implementations, the phase-separable glasses formed from the compositions disclosed herein, as employed in the second phase particles 20 of the antimicrobial composite article 100, can include 10 to 50 mol % cuprite, and all ranges and subranges therebetween, of the phase-separable glass.

In some embodiments, the glasses as employed in the second phase particles 20 of the antimicrobial composite article 100 may include about 70 wt % $Cu^{1+}$ or more and about 30 wt % of $Cu^{2+}$ or less. The $Cu^{2+}$ ions may be present in tenorite form and/or even in the glass (i.e., not as a crystalline phase).

In some embodiments, the total amount of Cu by wt % in the glasses as employed in the second phase particles 20 of the antimicrobial composite article 100 may be in the range from about 10 to about 30, from about 15 to about 25, from about 11 to about 30, from about 12 to about 30, from about 13 to about 30, from about 14 to about 30, from about 15 to about 30, from about 16 to about 30, from about 17 to about 30, from about 18 to about 30, from about 19 to about 30, from about 20 to about 30, from about 10 to about 29, from about 10 to about 28, from about 10 to about 27, from about 10 to about 26, from about 10 to about 25, from about 10 to about 24, from about 10 to about 23, from about 10 to about 22, from about 10 to about 21, from about 10 to about 20, from about 16 to about 24, from about 17 to about 23, from about 18 to about 22, from about 19 to about 21 and all ranges and sub-ranges therebetween. In one or more embodiments, the ratio of $Cu^{1+}$ ions to the total amount Cu in the glass is about 0.5 or greater, 0.55 or greater, 0.6 or greater, 0.65 or greater, 0.7 or greater, 0.75 or greater, 0.8 or greater, 0.85 or greater, 0.9 or greater or even 1 or greater, and all ranges and sub-ranges therebetween. The amount of Cu and the ratio of $Cu^{1+}$ ions to total Cu may be determined by inductively coupled plasma (ICP) techniques known in the art.

In some embodiments, the glass as employed in the second phase particles 20 of the antimicrobial composite article 100 may exhibit a greater amount of $Cu^{1+}$ and/or CuO than $Cu^{2+}$. For example, based on the total amount of $Cu^{1+}$, $Cu^{2+}$ and CuO in the glasses, the percentage of $Cu^{1+}$ and $Cu^{1+}$, combined, may be in the range from about 50% to about 99.9%, from about 50% to about 99%, from about 50% to about 95%, from about 50% to about 90%, from about 55% to about 99.9%, from about 60% to about 99.9%, from about 65% to about 99.9%, from about 70% to about 99.9%, from about 75% to about 99.9%, from about 80% to about 99.9%, from about 85% to about 99.9%, from about 90% to about 99.9%, from about 95% to about 99.9%, and all ranges and sub-ranges therebetween. The relative amounts of $Cu^{1+}$, $Cu^{2+}$ and $Cu^0$ may be determined using x-ray photoluminescence spectroscopy (XPS) techniques known in the art.

Referring again to FIGS. 1 and 1A, the plurality of second phase particles 20 of the antimicrobial composite article 100 can employ a phase-separable glass. In particular, the phase-separable glass can comprise at least a first phase and a second phase (distinct from the second phase particles 20). In one or more embodiments, the phase-separable glass may include two or more phases wherein the phases differ based on the ability of the atomic bonds in the given phase to withstand interaction with a leachate. Specifically, the glass of one or more embodiments may include a first phase that may be described as a degradable phase and a second phase that may be described as a durable phase. The phrases "first phase" and "degradable phase" may be used interchangeably. The phrases "second phase" and "durable phase" may be used interchangeably in the context of the phase-separable glass. As used herein, the term "durable" refers to the tendency of the atomic bonds of the durable phase to remain intact during and after interaction with a leachate. As used herein, the term "degradable" refers to the tendency of the atomic bonds of the degradable phase to break during and after interaction with one or more leachates. In one or more embodiments, the durable phase includes $SiO_2$ and the degradable phase includes at least one of $B_2O_3$, $P_2O_5$ and $R_2O$ (where R can include any one or more of K, Na, Li, Rb, and Cs). Without being bound by theory, it is believed that the components of the degradable phase (i.e., $B_2O_3$, $P_2O_5$ and/or $R_2O$) more readily interact with a leachate and the bonds between these components to one another and to other components in the phase-separable glass more readily break during and after the interaction with the leachate. Leachates may include water, acids or other similar materials. In one or more embodiments, the degradable phase withstands degradation for 1 week or longer, 1 month or longer, 3 months or longer, or even 6 months or longer. In some embodiments, longevity may be characterized as maintaining antimicrobial efficacy over a specific period of time.

In one or more embodiments of the antimicrobial composite article 100, the durable phase of the phase-separable glass employed in the second phase particles is present in an amount by weight that is greater than the amount of the degradable phase. In some instances, the degradable phase forms islands and the durable phase forms the sea surrounding the islands (i.e., the durable phase). In one or more embodiments, either one or both of the durable phase and the degradable phase may include cuprite. The cuprite in such embodiments may be dispersed in the respective phase or in both phases.

In some embodiments of the phase-separable glass, phase separation occurs without any additional heat treatment of the glass. In some embodiments, phase separation may occur during melting and may be present when the glass composition is melted at temperatures up to and including about 1600° C. or 1650° C. When the glass is cooled, the phase separation is maintained (e.g., in a metastable state).

Figure 1A:
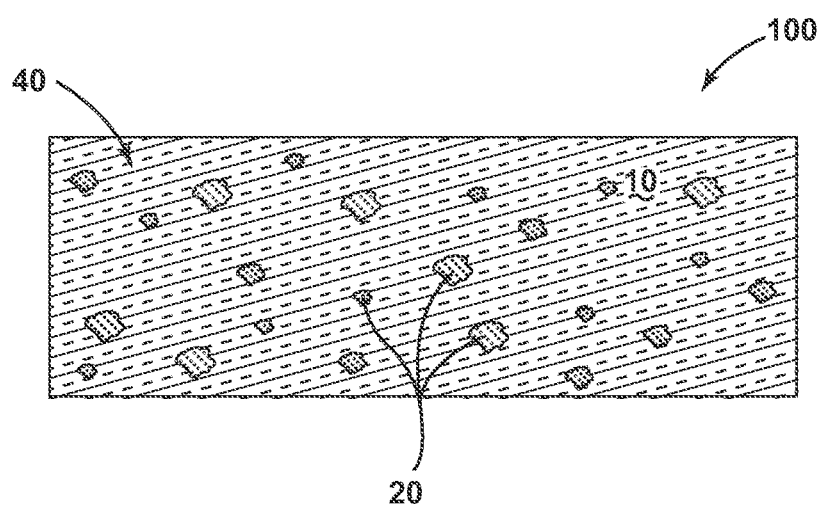
FIG. 1A is a plan view of an exterior surface of the antimicrobial composite article depicted in FIG. 1 that comprises an exposed portion of the matrix and second phase particles.

The phase-separable glass, as described in the foregoing, may be provided as a sheet or may have another shape such as particulate, fibrous, and the like. Referring to FIGS. 1 and 1A, the phase-separable glass is in the form of second phase particles 20, generally bounded by a matrix 10 that comprises a polymeric material. In the second phase particles 20 within the exposed portion of exterior surface 40, the surface portion of the particles 20 may include a plurality of copper ions wherein at least 75% of the plurality of copper ions includes $Cu^{1+}$-ions. For example, in some instances, at least about 80%, at least about 85%, at least about 90%, at least about 95%, at least about 98%, at least about 99% or at least about 99.9% of the plurality of copper ions in the surface portion includes $Cu^{1+}$ ions. In some embodiments, 25% or less (e.g., 20% or less, 15% or less, 12% or less, 10% or less or 8% or less) of the plurality of copper ions in the surface portion include $Cu^{2+}$ ions. For example, in some instances, 20% or less, 15% or less, 10% or less, 5% or less, 2% or less, 1% or less, 0.5% or less or 0.01% or less of the plurality of copper ions in the surface portion include $Cu^{2+}$ ions. In some embodiments, the surface concentration of $Cu^{1+}$ ions in the antimicrobial glass is controlled. In some instances, a $Cu^{1+}$ ion concentration of about 4 ppm or greater can be provided on the surface of the antimicrobial glass.

The antimicrobial composite articles 100 according to one or more embodiments, and particularly their exterior surfaces 30 and 40 with exposed portions, may exhibit a 2 log reduction or greater (e.g., 2.5, 3, 3.5, 4, 4.5, 5, 5.5, 6, 6.5 and all ranges and sub-ranges therebetween) in a concentration of at least one of *Staphylococcus aureus, Enterobacter aerogenes, Pseudomonas aeruginosa*, methicillin-resistant *Staphylococcus aureus* (MRSA), and *E. coli* bacteria under modified United States Environmental Protection Agency "Test Method for Efficacy of Copper Alloy Surfaces as a Sanitizer" (2009) testing conditions, wherein the modified conditions include substitution of the antimicrobial composite article with the copper-containing surface prescribed in the Method and use of copper metal article as the prescribed control sample in the Method (collectively, the "Modified EPA Copper Test Protocol"). As such, the United States Environmental Protection Agency "Test Method for Efficacy of Copper Alloy Surfaces as a Sanitizer" (2009) is hereby incorporated by reference in its entirety within the disclosure. In some instances, the antimicrobial composite articles exhibit at least a 4 log reduction, a 5 log reduction or even a 6 log reduction in the concentration of at least one of *Staphylococcus aureus, Enterobacter aerogenes, Pseudomonas aeruginosa* bacteria, MRSA, and *E. coli* under the Modified EPA Copper Test Protocol.

The antimicrobial composite articles 100 according to one or more embodiments may exhibit the log reductions described herein for long periods of time. In other words, the articles 100 may exhibit extended or prolonged antimicrobial efficacy. For example, in some embodiments, the antimicrobial composite articles 100 may exhibit the log reductions described herein under the Modified EPA Copper Test Protocol for a week, two weeks, three weeks, up to 1 month, up to 3 months, up to 6 months or up to 12 months after the antimicrobial composite article 100 is formed or after the phase-separable glass is combined with a carrier (e.g., polymeric matrix 10). These time periods may start at or after the antimicrobial composite article 100 is formed or combined with a carrier including but not limited to matrix 10.

According to one or more embodiments, the phase-separable glass of the second phase particle 20 may exhibit a preservative function, when combined with the matrix 10 described herein. In such embodiments, the phase-separable glass may kill or eliminate, or reduce the growth of various foulants in the matrix 10. Foulants include fungi, bacteria, viruses and combinations thereof.

According to one or more embodiments, the antimicrobial composite articles 100 containing the phase-separable glasses described herein leach copper ions when exposed or in contact with a leachate. In one or more embodiments, the glass leaches only copper ions when exposed to leachates including water.

In one or more embodiments, the antimicrobial composite articles 100 described herein may have a tunable antimicrobial activity release. The antimicrobial activity of the phase-separable glass may be caused by contact between the second phase particles 20 containing the glass and a leachate, such as water, where the leachate causes $Cu^{1+}$ ions to be released from the glass. This action may be described as water solubility and the water solubility can be tuned to control the release of the $Cu^{1+}$ ions.

In some embodiments, where the $Cu^{1+}$ ions are disposed in the glass network and/or form atomic bonds with the atoms in the glass network of the phase-separable glass, water or humidity breaks those bonds and the $Cu^{1+}$ ions available for release and may be exposed on the second phase particles 20.

In one or more embodiments of the antimicrobial composite articles 100, the phase-separable glass may be formed using formed in low cost melting tanks that are typically used for melting glass compositions such as soda lime silicate. Such phase-separable glass may be formed into a sheet or directly into a particulate using forming processes known in the art. For instance, example forming methods include float glass processes and down-draw processes such as fusion draw and slot draw. When the phase-separable glass is formed into a sheet, it is subsequently ground or otherwise processed to form the second phase particles 20 employed in the antimicrobial composite article 100.

In some implementations, the phase-separable glass may be incorporated into a variety of antimicrobial composite articles (e.g., article 100) and forms, either alone or in combination with other materials, such as electronic devices (e.g., mobile phones, smart phones, tablets, video players, information terminal devices, laptop computer, etc.), architectural structures (e.g., countertops or walls), appliances (e.g., cooktops, refrigerator and dishwasher doors, etc.), information displays (e.g., whiteboards), automotive components (e.g., dashboard panels, windshields, window components, etc.), counter-tops, table-tops, door knobs, rails, elevator control panels and other article having "high touch" surfaces. When used in such antimicrobial composite articles, the phase-separable glass can form at least part of the housing and/or display, e.g., by virtue of its concentration within the article as second phase particles 20 in the matrix 10.

After formation, the phase-separable glass may be formed into sheets and may be shaped, polished or otherwise processed for a desired end use. In some instances, the phase-separable glass is ground to a powder or particulate form to serve as the second phase particles 20 employed in the matrix 10 of the antimicrobial composite article. The combination of the phase-separable glass and the matrix material (e.g., a polymeric material serving as matrix 10) may be suitable for injection molding, extrusion or coatings. Such other materials or matrix materials may include polymers, monomers, binders, solvents, or a combination thereof as described herein. The polymer used in the embodiments described herein can include a thermoplastic polymer (e.g., a polyolefin), a cured polymer (e.g., an ultraviolet- or UV-cured polymer, thermosetting polymer, thermosetting coating, etc.), a polymer emulsion, a solvent-based polymer, and combinations thereof. Examples of suitable polymers include, without limitation: thermoplastics including polysulfone (PU), polystyrene (PS), high impact PS, polycarbonate (PC), nylon (sometimes referred to as polyamide (PA)), poly(acrylonitrile-butadiene-styrene) (ABS), PC-ABS blends, polybutyleneterephthlate (PBT) and PBT co-polymers, polyethyleneterephthalate (PET) and PET co-polymers, polyolefins (PO) including polyethylenes (PE), polypropylenes (PP), cyclicpolyolefins (cyclic-PO), modified polyphenylene oxide (mPPO), polyvinylchloride (PVC), acrylic polymers including polymethyl methacrylate (PMMA), thermoplastic elastomers (TPE), thermoplastic urethanes (TPU), polyetherimide (PE1) and blends of these polymers with each other. Suitable injection moldable thermosetting polymers include epoxy, acrylic, styrenic, phenolic, melamine, urethanes, polyesters and silicone resins. In certain aspects, the matrix material serving as matrix 10 can comprise a low (e.g., a polyolefin) or a high (e.g., polyethyleneimine) melting point polymeric material. According to some aspects, the matrix comprises a low or high molecular weight polymeric material. It should also be understood that the matrix material can comprise a bulk polymeric material (e.g., pure polyolefin), a blend of polymeric materials (e.g., a polyethylene/polypropylene mixture) and/or a composite polymeric material (e.g., a polyolefin/glass composite). Other suitable polymeric variants include linear, ladder and branched polymers (e.g., star polymers, brush polymers and dendrons/dentrimers). Another polymeric material variant that can be employed for the matrix 10 includes copolymers (e.g., linear, branched and cyclo/ring).

In other embodiments, the polymers may be dissolved in a solvent or dispersed as a separate phase in a solvent and form a polymer emulsion, such as a latex (which is a water emulsion of a synthetic or natural rubber, or plastic obtained by polymerization and used especially in coatings (as paint) and adhesives. Polymers may include fluorinated silanes or other low friction or anti-frictive materials. The polymers can contain impact modifiers, flame retardants, UV inhibitors, antistatic agents, mold release agents, fillers including glass, metal or carbon fibers or particles (including spheres), talc, clay or mica and colorants. Specific examples of monomers include catalyst curable monomers, thermally-curable monomers, radiation-curable monomers and combinations thereof.

In one or more embodiments, the phase-separable glass may be provided in particulate form as second phase particles 20. In this form, the phase-separable glass may have a diameter in the range from about 0.1 micrometers (µm) (µm) to about 10 micrometers (µm) (µm), from about 0.1 micrometers (µm) (µm) to about 9 micrometers (µm) (µm), from about 0.1 micrometers (µm) (µm) to about 8 micrometers (µm) (µm), from about 0.1 micrometers (µm) (µm) to about 7 micrometers (µm) (µm), from about 0.1 micrometers (µm) (µm) to about 6 micrometers (µm) (µm), from about 0.5 micrometers (µm) (µm) to about 10 micrometers (µm) (µm), from about 0.75 micrometers (µm) (µm) to about 10 micrometers (µm) (µm), from about 1 micrometers (µm) (µm) to about 10 micrometers (µm) (µm), from about 2 micrometers (μm) (μm) to about 10 micrometers (μm) (μm), from about 3 micrometers (μm) (μm) to about 10 micrometers (μm) (μm) from about 3 micrometers (μm) (μm) to about 6 micrometers (μm) (μm), from about 3.5 micrometers (μm) (μm) to about 5.5 micrometers (μm) (μm), from about 4 micrometers (μm) (μm), to about 5 micrometers (μm) (μm), and all ranges and sub-ranges therebetween. The glass may be substantially spherical or may have an irregular shape.

Without being bound by theory it is believed that the combination of the phase-separable glass described herein (e.g., within second phase particles 20) and a matrix (e.g., matrix 1), such as a polypropylene or polysulfone material, provides substantially greater antimicrobial efficacy as compared to the same matrix materials that includes only $Cu_2O$ (cuprite), even when the same amount of copper is utilized. The presence of $Cu^{1+}$ crystals in the phase-separable glasses described herein, even when present as cuprite, tends to remain in the $Cu^{1+}$ state. Without being bound by theory, it is believed that when $Cu_2O$ is provided alone, separate from the phase-separable glasses described herein, the Cu ions are less stable and may change to $Cu^{2+}$ from $Cu^{1+}$.

The antimicrobial performance of the antimicrobial composite articles 100 described herein can be influenced by the presence and thickness a thin layer of the matrix 10 coincident with or over the second phase particles 20 on the exterior surface 40 (see FIGS. 1 and 1A). Depending on the composition of the matrix 10 and its process history, this thin layer may exhibit hydrophobic or substantially hydrophobic properties and may block the active copper species ($Cu^{1+}$) from exposure to air or from leaching to the exterior surface 40. For example, a matrix 10 comprising a polymeric material that is hydrophobic or substantially hydrophobic (e.g., a polyolefin) can result in such a thin layer. In one or more embodiments, the articles 100 may also use polymers as the matrix 10 that have balanced hydrophobic-hydrophilic properties that facilitate leaching of the active copper species. Examples of such polymers include hygroscopic/water soluble polymers and surfactants, amphiphilic polymers (e.g., poly(vinyl alcohol-co-ethylene)) and/or a combination of amphiphilic polymers and hygroscopic materials. In other implementations, the matrix 10 may comprise a polymeric material with substantially hydrophilic properties (e.g., poly (vinyl alcohol)).

In one or more embodiments, the exposure to air and/or leaching of the active copper species to the surface may be facilitated by configuring the articles 100 such that its exterior surface 40 (and, in some cases, exterior surfaces 30) with an "exposed portion". As used herein, such an "exposed portion" is a portion of an exterior surface of the antimicrobial composite article 100 that has been mechanically and/or chemically treated to expose at least some of the second phase particles 20 containing the phase-separable glass contained in the article 100 (and surrounded by matrix 10) to the air or to provide some portion of the phase-separable glass at the exterior surfaces 30, 40 of the article. Specific methods for providing an exposed portion of an exterior surface include sanding, polishing, plasma treating (e.g., air, $N_2$, $O_2$, $H_2$, $N_2$ and/or Argon based plasma) and other methods that will remove a thin layer of the matrix 10 (e.g., a polymeric material). In one or more alternative embodiments, the exposed portion of the exterior surfaces 30, 40 includes functional groups, particularly hydroxyl and carbonyl groups, which are introduced into or to the exposed treated surface, to make such surface more hydrophilic. By providing an exposed portion of an exterior surface, the active copper species is exposed to air or more readily leaches the surface of the article 100.

To improve processing, mechanical properties and interactions between the matrix 10 (e.g., a polymeric material) and the second phase particles 20 (e.g., phase-separable glass) described herein (including any fillers and/or additives that may be used), processing agents/aids may be included in the antimicrobial composite articles 100 described herein. Exemplary processing agents/aids can include solid or liquid materials. The processing agents/aids may provide various extrusion benefits, and may include silicone based oil, wax and free flowing fluoropolymer. In other embodiments, the processing agents/aids may include compatibilizers/coupling agents, e.g., organosilicon compounds such as organo-silanes/siloxanes that are typically used in processing of polymer composites for improving mechanical and thermal properties. Such compatibilizers/coupling agents can be used to surface modify the glass and can include (3-acryloxy-propyl)trimethoxysilane; N-(2-aminoethyl)-3-aminopropyltrimethoxysilane; 3-aminopropyltriethoxysilane; 3-aminopropyltrimethoxysilane; (3-glycidoxypropyl)trimethoxysilane; 3-mercaptopropyltrimethoxysilane; 3-methacryloxypropyltrimethoxysilane; and vinyltrimethoxysilane.

In some embodiments, the antimicrobial composite articles 100 described herein may include fillers including pigments, that are typically metal based inorganics can also be added for color and other purposes, e.g., aluminum pigments, copper pigments, cobalt pigments, manganese pigments, iron pigments, titanium pigments, tin pigments, clay earth pigments (naturally formed iron oxides), carbon pigments, antimony pigments, barium pigments, and zinc pigments.

After combining the phase-separable glass described herein with a matrix 10, as described herein, the combination may be formed into a desired antimicrobial composite article 100. Examples of such articles 100 include housings for electronic devices (e.g., mobile phones, smart phones, tablets, video players, information terminal devices, laptop computer, etc.), architectural structures (e.g., countertops or walls), appliances (e.g., cooktops, refrigerator and dishwasher doors, etc.), information displays (e.g., whiteboards), and automotive components (e.g., dashboard panels, windshields, window components, etc.).

In one or more embodiments, the articles 100 may exhibit desired porosity and may be made into different shapes, including complex shapes and in different forms including plastics, rubbers and fiber/fabrics, which can have the same or different applications. Porous articles can also be used as antimicrobial filters. For example, the articles may be extruded into a honeycomb structure, which not only includes channels but also porous channel walls.

In other embodiments, the articles 100 may include a high glass loading associated with the second phase particles 20. Such articles may be formed from a melting process or the wet process. In such embodiments, in addition to using the articles 100 themselves as an antimicrobial material, the matrix 10 (e.g., a polymeric material) can be burnt out or removed to (i.e., the article employs the matrix 10 as a fugitive material) provide a pure copper glass antimicrobial article that is porous, with a simple or complex shape.

Cu(I) is an excellent catalyst for organic reactions, particularly for mild organic reactions, such as polymerization of acrylic monomers and oleochemical applications (e.g., hydrogenolysis of fatty esters to fatty alcohols including both methyl ester and wax ester processes, alkylation of alcohols with amines and amination of fatty alcohols), just to name a few. The antimicrobial composite articles 100 described herein may be used for such catalyst-oriented applications, even if not employed in an application that utilizes their inherent antimicrobial properties.

Figure 1B:
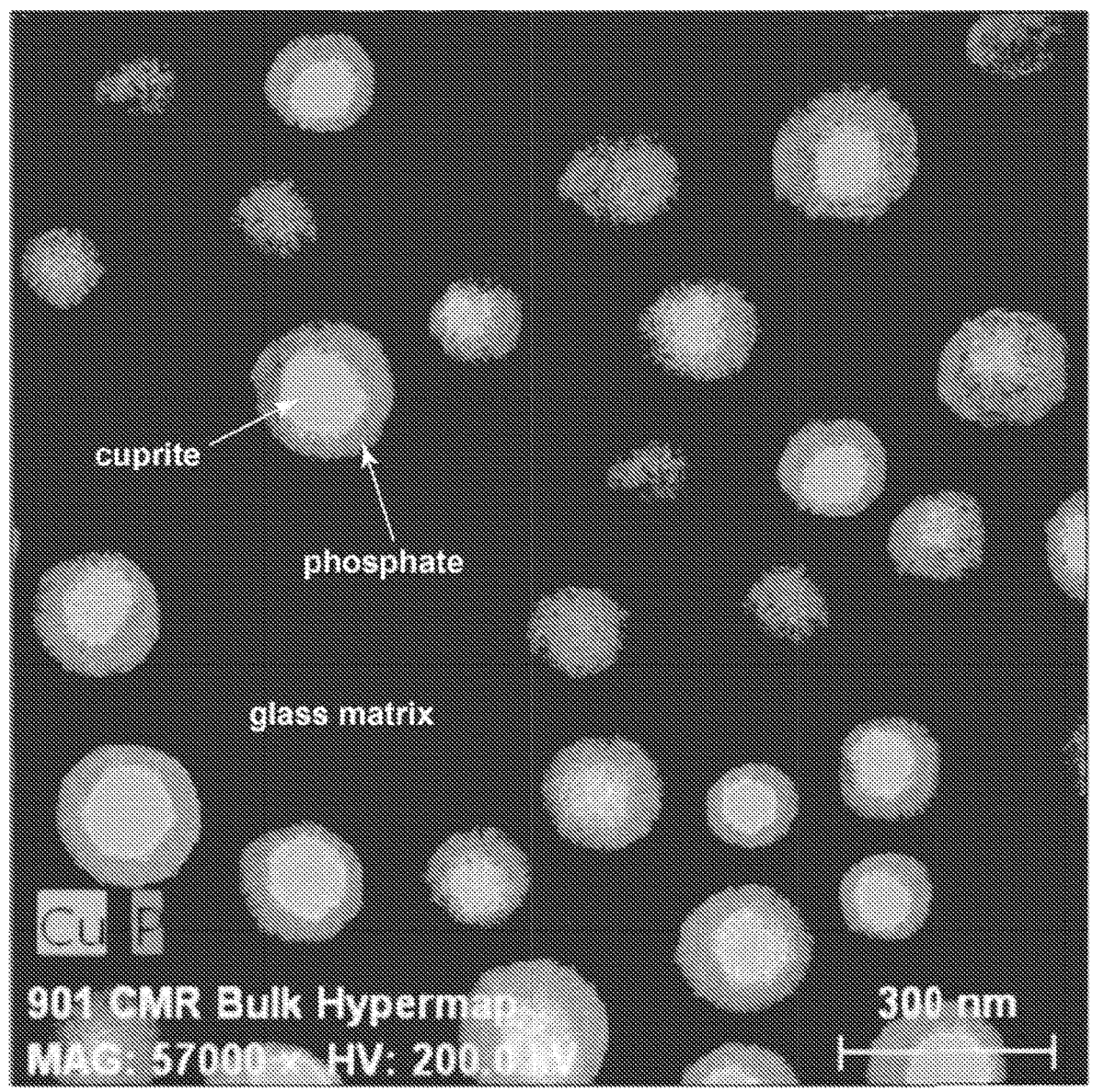
FIG. 1B is an energy dispersive spectroscopy (EDS) image of phase-separable glass in an exterior surface of an antimicrobial composite article according to an aspect of the disclosure that is comparable to the antimicrobial composite article schematically depicted in FIG. 1.

Referring to FIG. 1B, an energy dispersive spectroscopy (EDS) image of phase-separable glass in an exterior surface of an antimicrobial composite article is provided according to an aspect of the disclosure that is comparable to the antimicrobial composite article 100 schematically depicted in FIG. 1. More specifically, the phase-separable glass in the EDS image in FIG. 1B is exemplary of the second phase particles 20 in an exposed portion of an exterior surface 40 (see FIG. 1A). In FIG. 1B, the phase-separable glass was prepared according to U.S. patent application Ser. No. 14/623,077, filed on Feb. 16, 2015, the salient portions of which related to phase-separable glass processing are hereby incorporated by reference within this disclosure. In FIG. 1B, the glass depicted in the EDS image is a phase-separable phosphate glass that contains cuprite crystals (~35 mol % cuprite) with a particle size of 100 to 250 nm in the discontinuous, low durability phase (i.e., the phosphate phase) and possesses a high antimicrobial efficacy. In addition, the phase-separable phosphate glass comprises carbon black concentrate for color (i.e., Clariant Corporation SL94620036 carbon black). Further, the phase-separable glass depicted in FIG. 1B can be jet milled to a powder form and sieved (e.g., with a 325 mesh) to form a particulate for use as second phase particles 20 in an antimicrobial composite article 100. The particulate can then be compounded with a matrix polymer (e.g., serving as matrix 10) to obtain the final antimicrobial composite article form.

Figure 2:
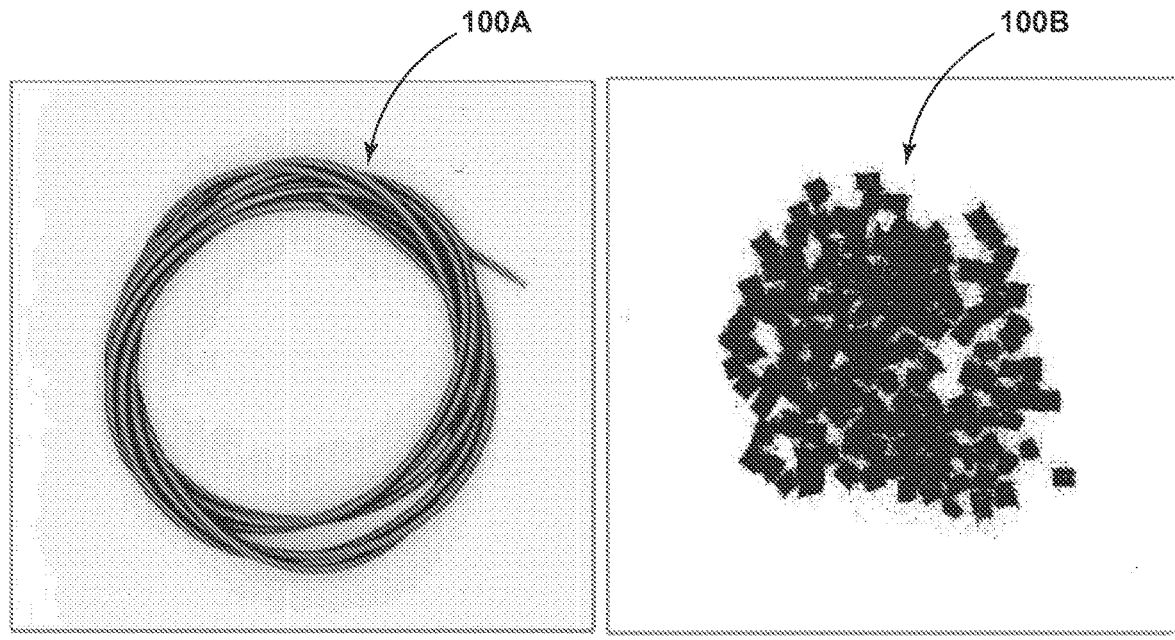
FIG. 2 are photographs of antimicrobial composite strip and pellet articles having a polypropylene matrix and a plurality of second phase particles comprising a phase-separable glass with a copper-containing antimicrobial agent according to another aspect of the disclosure.

In an aspect of the disclosure, the foregoing antimicrobial composite article 100 containing the phase-separable glass depicted in FIG. 1B can be compounded with polypropylene (serving as the matrix) with an extrusion process. For example, a Leistritz AG MIC18-7R GL twin-screw extruder can be employed for this process according to the representative conditions outlined below in Table 1. The extruder can then be employed to produce the antimicrobial composite strip 100A (see FIG. 2) without a carbon black colorant and a set of antimicrobial composite pellets 100B (see FIG. 2) with a carbon black colorant. Note that the pellets 100B were obtained by a further processing of the strip obtained from the extruder.

TABLE ONE

| | |
|---|---|
| Extruder speed (RPM) | 700 |
| Zone 1 (° C.) | 210 |
| Zone 2 (° C.) | 220 |
| Zone 3 (° C.) | 225 |
| Zone 4 (° C.) | 230 |
| Zone 5 (° C.) | 235 |
| Zone 6 (° C.) | 240 |
| Die (° C.) | 240 |
| Melt Pressure (MPa) | 1.4 |
| Air Cooling Pressure (MPa) | N/A |

Figure 3:
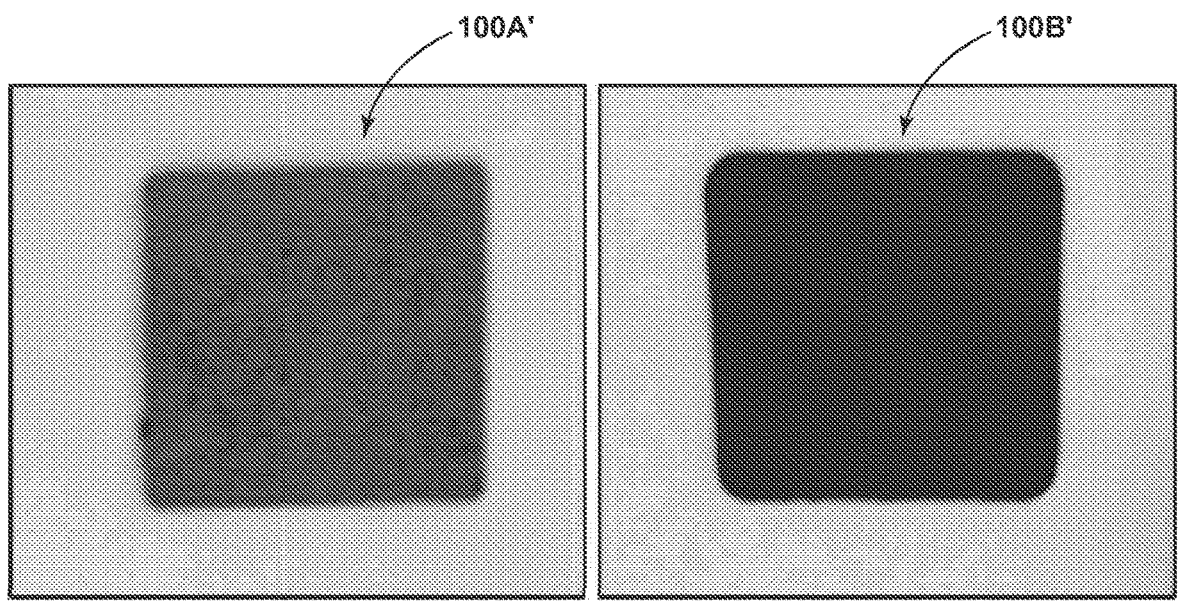
FIG. 3 are photographs of antimicrobial composite articles having a polypropylene matrix and a plurality of second phase particles comprising a phase-separable glass with a copper-containing antimicrobial agent that are configured in the form of test coupons for assessing antimicrobial efficacy with the Modified EPA Copper Test Protocol.

Referring to FIG. 3, an extruded antimicrobial composite form (e.g., the strip and pellets of FIG. 2) can be injection molded or otherwise processed into a sheet form as a coupon. In particular, FIG. 3 presents photographs of the antimicrobial composite coupons 100A' and 100B'. The coupons 100A' and 100B' were prepared by injection molding the antimicrobial composite strip 100A and pellets 100B (see FIG. 2), respectively.

Referring again to FIG. 3, the antimicrobial composite coupons 100A' and 100B' are 2.5 cm×2.5 cm square coupons suitable for antimicrobial efficacy testing with the Modified EPA Copper Test Protocol. Through various antimicrobial efficacy tests conducted under the Modified EPA Copper Test Protocol of coupons fabricated according to the foregoing antimicrobial composite article 100 forms, it was apparent that the as-fabricated composites can possess a thin layer of polymeric matrix material at an exterior surface subject to such testing. Without being bound by theory, it is believed that a thin layer of such matrix material can prevent the copper in the phase-separable glass from being effectively exposed to the air and bacteria to obtain high antimicrobial efficacy. It is also believed, without being bound by theory, that antimicrobial efficacy can depend on the degree of hydrophobicity (or, conversely, hydrophilicity) associated with the matrix material at an exterior surface subject to the testing. For example, such composite articles having polymeric matrix materials that exhibit substantial hydrophobicity are prone to a scenario in which the bacteria (typically in an aqueous medium) does not uniformly spread across the exterior surface under test, resulting in lower than desired antimicrobial efficacy levels.

Figure 4:
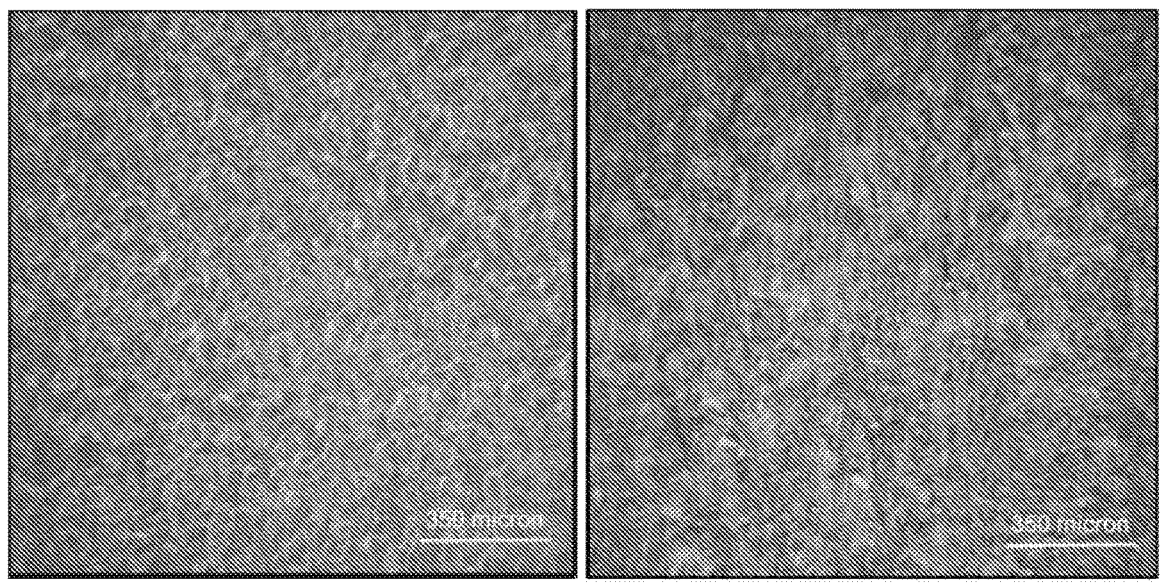
FIG. 4 are optical micrographs of an exterior surface of antimicrobial composite articles having a polypropylene matrix and a plurality of second phase particles comprising a phase-separable glass with a copper-containing antimicrobial agent before and after a hand-sanding abrasion step according to an aspect of the disclosure.

According to an aspect of the disclosure, exterior surfaces of the antimicrobial composite articles (e.g., exterior surface 40 of the article 100 depicted in FIGS. 1 and 1A) can be subjected to (a) mechanical removal of a thin layer of polymeric matrix material; and/or (b) surface chemistry modifications to introduce hydrophilic groups. With regard to the mechanical removal approach, hand sanding, grit blasting, polishing and other forms of material removal processes can be employed on such exterior surfaces to expose a larger amount of the surface area associated with the second phase particles containing the phase-separable glass with the copper-containing antimicrobial agent. Suitable approaches include hand sanding, e.g., with a 3M™ Contour Surface sanding sponge, to remove about 5 to 10 mg of material from the exterior surface of the antimicrobial composite article. The optical micrographs in FIG. 4 with a 350 micron scale demonstrate an exterior surface of an antimicrobial composite article with a polypropylene matrix and a phase-separable copper-containing glass before and after such a hand sanding procedure. Another mechanical material removal approach is sand blasting, e.g., with standard, known sand blasting equipment employing silica sand particulate. Typical sand blasting conditions employ sand at 0.1 to 0.5 MPa for 10 to 60 seconds of exposure.

Figure 5:
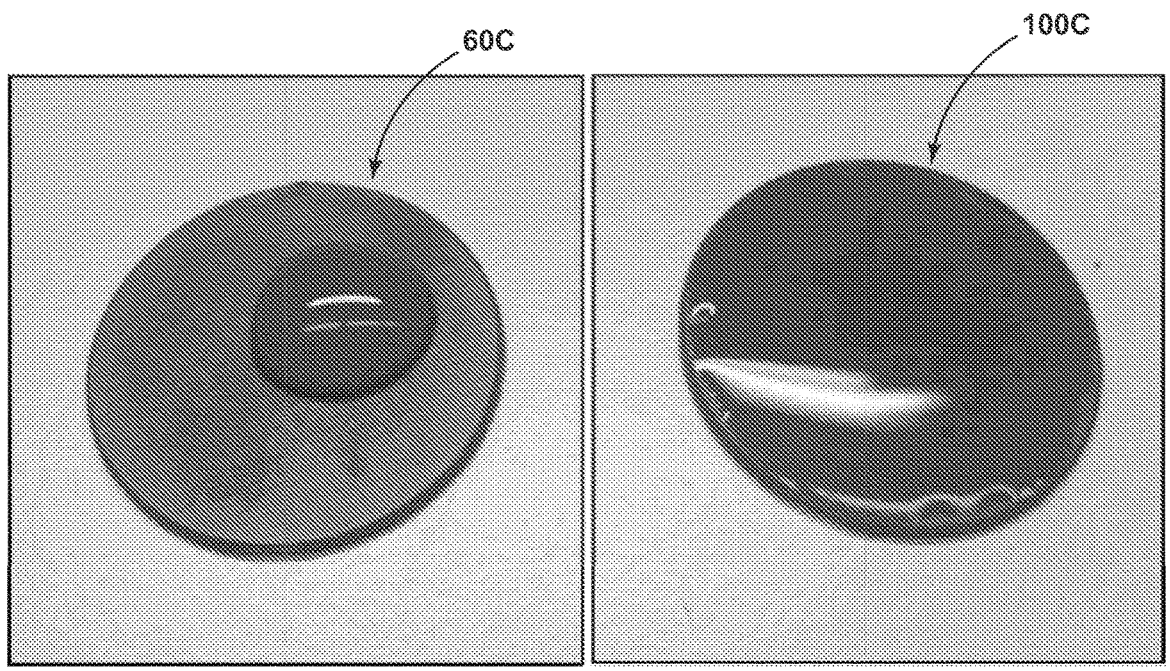
FIG. 5 are optical micrographs of an exterior surface of the antimicrobial composite articles depicted in FIG. 4, as contacted with a bacteria-containing aqueous solution before and after a plasma-treatment step according to an aspect of the disclosure.

As for the surface modification approach, various techniques and processes may be employed to introduce hydrophilic groups on to the exterior surface 40 of the antimicrobial composite article 100. In one aspect, the exterior surface 40 is subjected to a plasma treatment with a Nordson March Plasmod system. Such a system can be employed to plasma treat the exterior surfaces of the antimicrobial composite articles, e.g., at 75 W for 8 min in an air or oxygen atmosphere. As shown in the optical micrographs of FIG. 5, an exterior surface of an antimicrobial composite article with a polypropylene matrix and a phase-separable copper-containing glass demonstrates a significant increase in wetting of an aqueous bacteria solution (e.g., as consistent with bacteria-containing media in the Modified EPA Copper Test Protocol) after such a plasma treatment step. In particular, the image on the left side of FIG. 5 depicts an exterior surface of the composite article wetted with the bacteria-containing solution before being subjected to the plasma treatment. The image on the right depicts an exterior surface of the composite article wetted with the same bacteria-containing solution after the surface had been subjected to a plasma treatment.

Without being bound by theory, it is believed that a combination of the foregoing mechanical material removal and surface chemistry modification approaches results in an exterior surface 40 of an antimicrobial composite article with very high antimicrobial efficacy levels, well above the levels that can be achieved by the use of either of techniques alone. Moreover, the sequencing of these techniques does not appear to influence the final antimicrobial efficacy levels achieved by such antimicrobial composite articles. Accordingly, an aspect of the disclosure involves the combination of mechanical material removal and surface chemistry modification to exterior surfaces of an antimicrobial composite article, conducted in either order.

Figure 6:
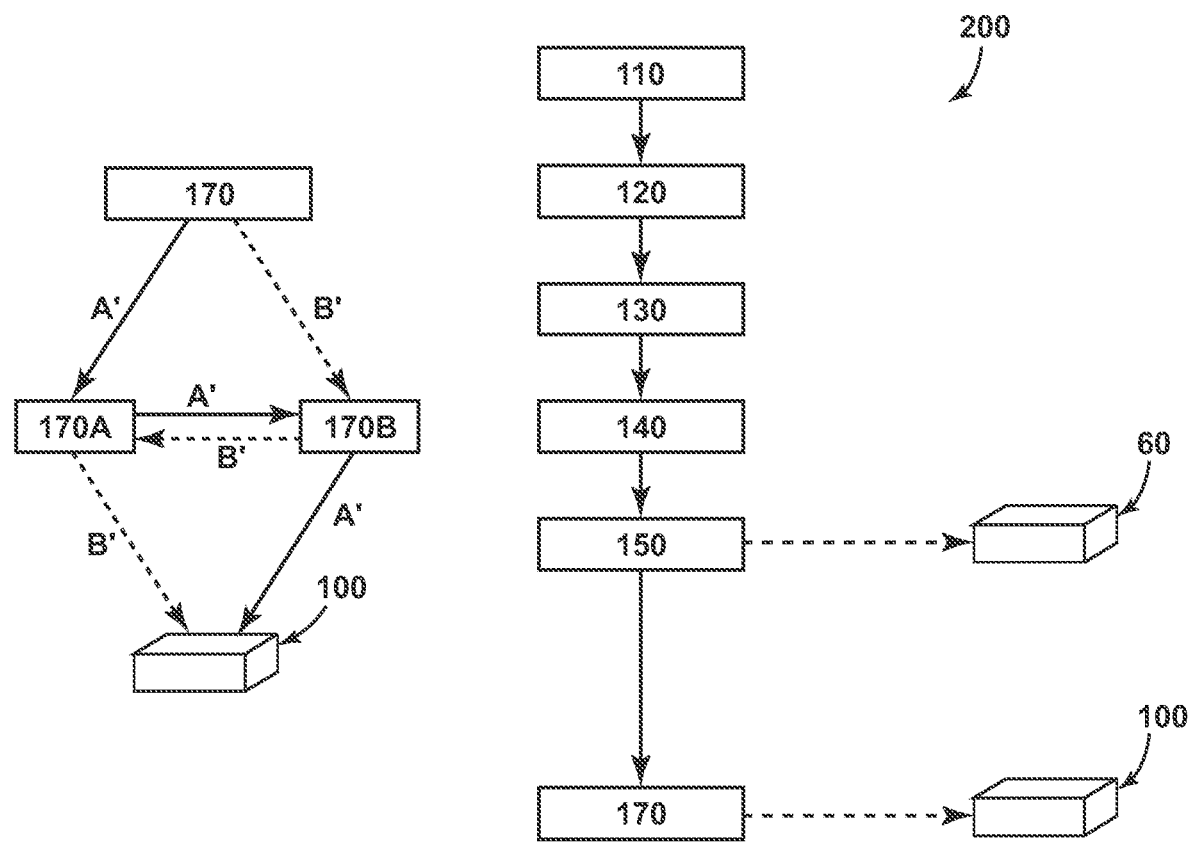
FIG. 6 is a schematic flow chart of a method of making an antimicrobial composite article according to a further aspect of the disclosure.

According to an aspect of the disclosure, a method 200 of making an antimicrobial composite article 100 is provided, as shown in FIG. 6. In particular, the method includes a step 110 for providing a matrix (e.g., matrix 10—see FIG. 1) comprising a polymeric material; and a step 120 for providing a plurality of second phase particles (e.g., second phase particles 20) comprising an antimicrobial agent. Further, the method 200 includes a step 130 for melting the matrix 10 to form a matrix melt. Next, the method 200 includes a step 140 for distributing the plurality of second phase particles 20 in the matrix melt at a second phase volume fraction to form a composite melt; and a step 150 for forming a composite article 60 from the composite melt. In addition, the method 200 includes a final step 160 for treating the composite article 60 to form an antimicrobial composite article 100 having an exterior surface (e.g., exterior surface 40) comprising an exposed portion of the matrix and the plurality of second phase particles.

Referring again to FIG. 6, the step 170 of the method 200 of making an antimicrobial composite article 100 includes a step 170A for abrading (e.g., material removal from an exterior surface through mechanical means) the composite article and a step 170B for plasma-treating the composite article 60, both steps conducted to develop the antimicrobial composite article 100. As shown in FIG. 6, steps 170A and 170B can be performed in either order. According to a further aspect of the method 200, step 170A for abrading the composite article can be used alone to form the antimicrobial composite article 100 for the specific situation in which the matrix material (e.g., matrix 10) primarily comprises a hydrophilic, polymeric material. As the matrix material is already in a hydrophilic state, it stands to reason the exterior surfaces of the composite article will also be hydrophilic in nature obviating the need for a surface chemistry modification step such as step 170A.

In some aspects, the treating step 170 of the method 200 of making the antimicrobial composite article (see FIG. 6) can include abrading (e.g., as in step 170A) the composite article 60 to form an antimicrobial composite article 100 having an exterior surface 40 comprising an exposed portion of the matrix 10 and the plurality of second phase particles 20. The abrading can be conducted with hand sanding, grit blasting or other similar grinding and/or polishing techniques. In other aspects of the method, the treating step 170 can include abrading and plasma-treating (e.g., as in step 170B) the composite article 60 to form an antimicrobial composite article 100 having an exterior surface 40 comprising an exposed portion of the matrix 10 and the plurality of second phase particles 20. In these implementations, the abrading can be performed before the plasma-treating or vice versa. Further, the plasma-treating can conducted with any of a variety of known processes that produce or otherwise create functional groups in the exposed portion of the matrix on the exterior surface of the article.

According to some aspects of the method 200, the melting and distributing steps 130 and 140, respectively, can include or otherwise employ an extrusion process. In addition, step 140 for distributing the second phase particles 20 in the matrix can be conducted with a melt process (e.g., compounding/extrusion and injection molding). Step 140 can also be conducted with a solution process (e.g., adding the second phase particles 20 into a coating with the matrix 10 material), a bulk polymerization process and/or with a solution polymerization process (e.g., a suspension process or emulsion process for the second phase particles 20). Further, the step 150 for forming a composite article can include or otherwise employ an injection molding process. As such, the forming step 150 can be employed to fashion the composite article in a final product form or a near net shape form.

In one aspect, the method 200 of making an antimicrobial composite article 100 can include the following steps: providing a matrix comprising a hydrophobic polymeric material (e.g., step 110); providing a plurality of second phase particles comprising a copper-containing antimicrobial agent (e.g., step 120); melting the matrix to form a matrix melt (e.g., step 130); extruding the plurality of second phase particles in the matrix melt at a second phase volume fraction to form a composite melt (e.g., step 140); injection molding a composite article (e.g., composite article 60) from the composite melt (e.g., step 150); and treating the composite article to form an antimicrobial composite article having an exterior surface comprising an exposed portion of the matrix and the plurality of second phase particles (e.g., step 170). Further, the exposed portion of the plurality of second phase particles is distributed within the exposed portion of the matrix at a second phase area fraction within ±25% of the second phase volume fraction.

Figure 7A:
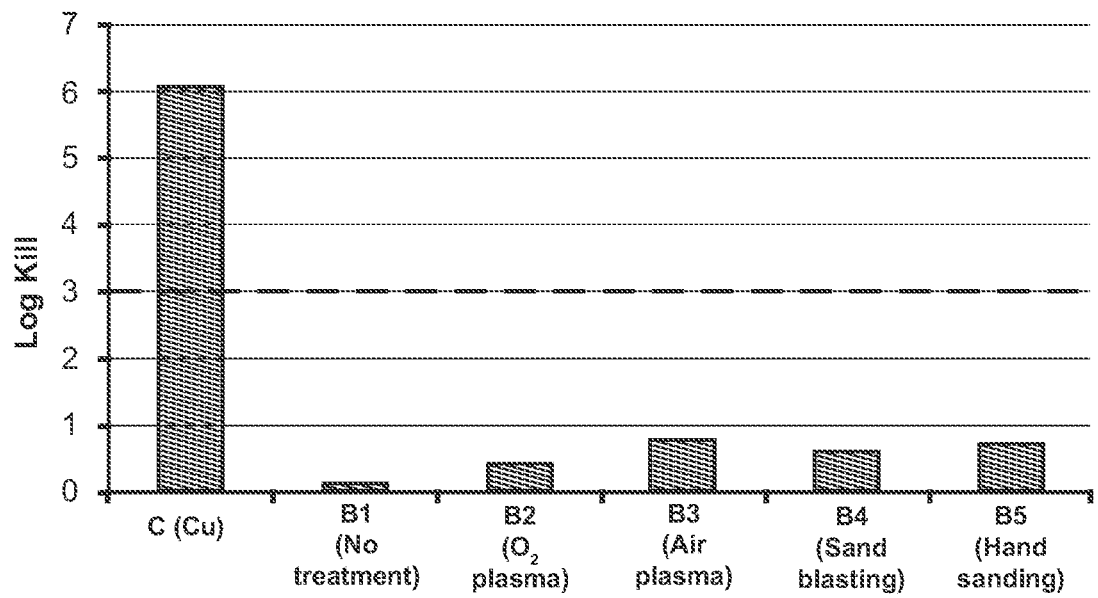
FIG. 7A is a bar chart depicting the antimicrobial efficacy of antimicrobial composite articles having a polypropylene matrix and a plurality of second phase particles comprising a phase-separable glass with a copper-containing antimicrobial agent, and subjected to various surface treatment steps.

Referring to FIG. 7A, a bar chart depicts the antimicrobial efficacy (as tested with the Modified EPA Copper Test Protocol) of antimicrobial composite articles having a polypropylene matrix and a plurality of second phase particles comprising a phase-separable glass with a copper-containing antimicrobial agent, and subjected to various surface treatment steps. In FIG. 7A, the sample group designated "C" is a control sample of pure copper material. Sample groups "B1" through "B5" are indicative of antimicrobial composite articles subjected to various surface treatment steps—i.e., no treatment, plasma treatment in oxygen, plasma treatment in air, sand blasting, and hand sanding, respectively. As demonstrated by FIG. 7A, the various treatment steps conducted alone on the antimicrobial composite articles provide little benefit in terms of antimicrobial efficacy as all such samples B1-B5 demonstrated a log kill of less 1 compared to the copper control sample C at a log kill of 6.

Figure 7B:
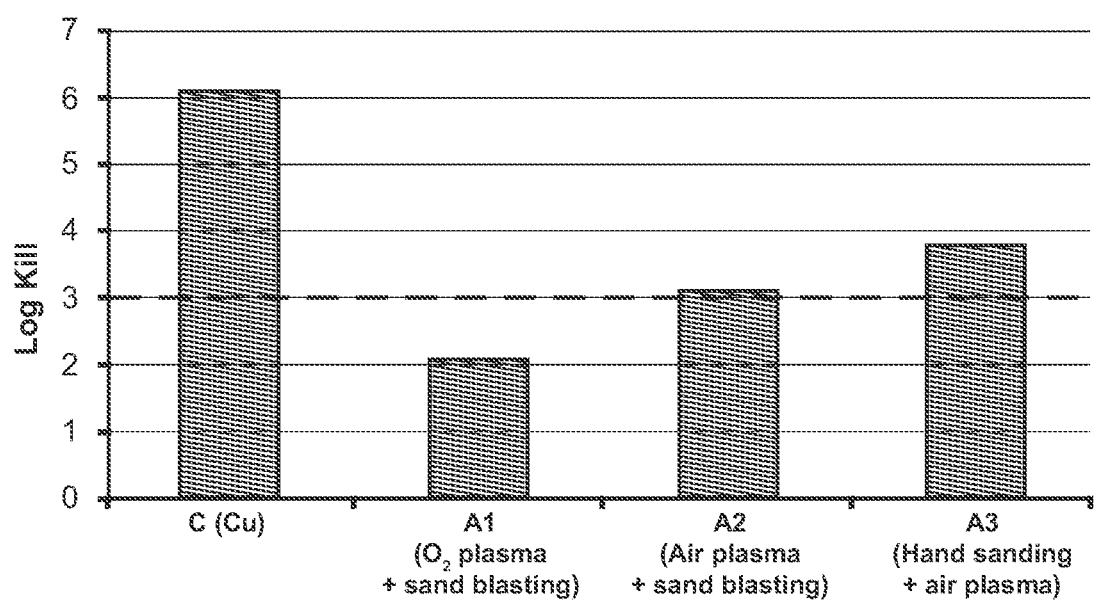
FIG. 7B is a bar chart depicting the antimicrobial efficacy of antimicrobial composite articles having a polypropylene matrix and a plurality of second phase particles comprising a phase-separable glass with a copper-containing antimicrobial agent, and subjected to various surface treatment steps.

FIG. 7B is a bar chart depicting the antimicrobial efficacy (as tested with the Modified EPA Copper Test Protocol) of antimicrobial composite articles having a polypropylene matrix and a plurality of second phase particles comprising a phase-separable glass with a copper-containing antimicrobial agent, and subjected to various surface treatment steps. In FIG. 7B, the sample group designated "C" is a control sample of pure copper material. Sample groups "A1" through "A3" are indicative of antimicrobial composite articles subjected to various surface treatment steps—i.e., plasma treatment in oxygen and sand blasting, plasma treatment in air and sand blasting, and hand sanding and plasma treatment in air, respectively. As demonstrated by FIG. 7B, the various treatment steps conducted in combination on the antimicrobial composite articles provide a significant benefit in terms of antimicrobial efficacy as all such samples A1, A2 and A3 demonstrated a log kill of 2 or more.

Figure 8A:
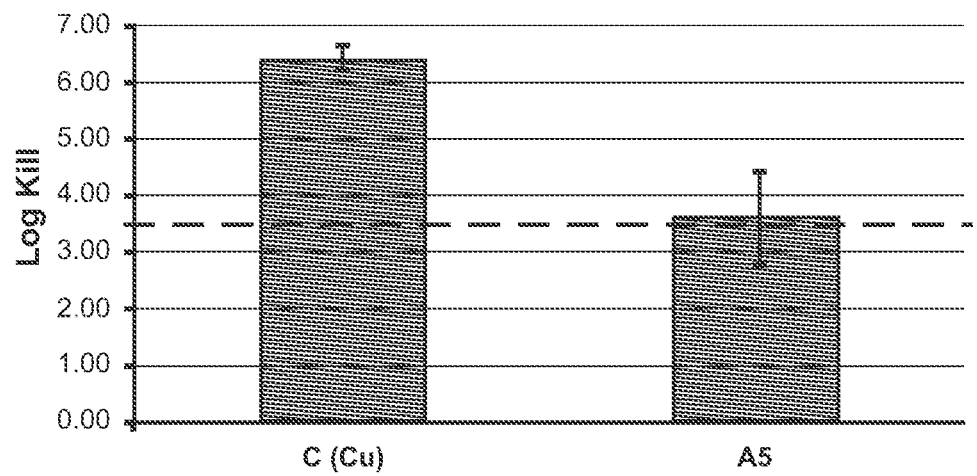
FIGS. 8A & 8B are bar charts depicting the antimicrobial efficacy of antimicrobial composite articles having a polysulfone matrix and a plurality of second phase particles comprising a phase-separable glass with a copper-containing antimicrobial agent, and subjected to various surface treatment steps.
Figure 8B:
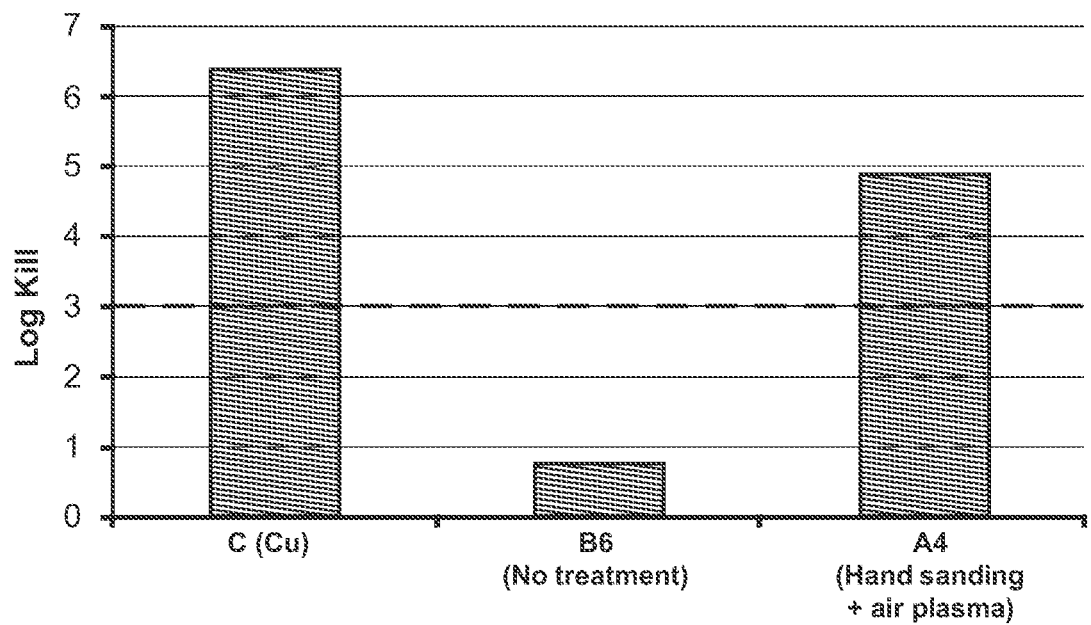

FIGS. 8A & 8B are bar charts depicting the antimicrobial efficacy (as tested with the Modified EPA Copper Test Protocol) of antimicrobial composite articles having a polysulfone matrix and a plurality of second phase particles comprising a phase-separable glass with a copper-containing antimicrobial agent, and subjected to various surface treatment steps. In both FIGS. 8A & 8B, the sample group designated "C" is a control sample of pure copper material. In FIG. 8A, the sample group designated "A5" is indicative of an antimicrobial composite article subjected to plasma treatment and sanding process steps. In FIG. 8B, the sample group designated "B6" is indicative of an antimicrobial composite article subjected to no surface treatments and the sample group designated "A4" is indicative of an antimicrobial composite article subjected to a hand sanding step followed by a plasma treatment step in air. As demonstrated by FIGS. 8A & 8B, antimicrobial composite articles having a polysulfone matrix and a plurality of second phase particles comprising a phase-separable glass with a copper-containing antimicrobial agent can exhibit antimicrobial efficacy levels (i.e., log kill reductions of 3 or more) comparable or even exceeding similar such antimicrobial composite articles employing a polypropylene matrix (see, e.g., FIGS. 7A & 7B).

Figure 9:
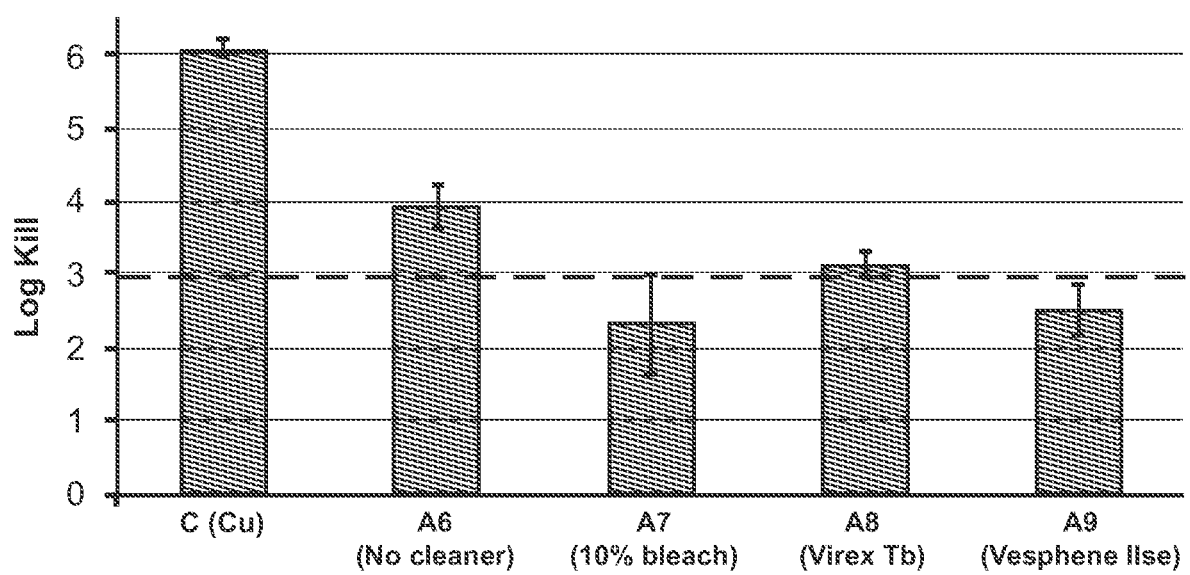
FIG. 9 is a bar chart depicting the antimicrobial efficacy of antimicrobial composite articles having a polypropylene matrix and a plurality of second phase particles comprising a phase-separable glass with a copper-containing antimicrobial agent, and subjected to various hospital grade cleaners.

Referring to FIG. 9, a bar chart depicts the antimicrobial efficacy (as tested with the Modified EPA Copper Test Protocol) of antimicrobial composite articles having a polypropylene matrix and a plurality of second phase particles comprising a phase-separable glass with a copper-containing antimicrobial agent, as subjected to various hospital grade cleaners. In FIG. 9, the sample group designated "C" is a control sample of pure copper material. Sample groups "A6" through "A9" are indicative of antimicrobial composite articles subjected to a mechanical surface removal step (e.g., sanding) and a surface chemistry modification step (e.g., plasma treatment in air), followed by no exposure to a hospital grade cleaner (A6) or exposure to various hospital grade cleaners—i.e., 10% bleach (A7), Virex Tb (A8), and Vesphene Ilse (A9). As demonstrated by FIG. 9, the exposure to the hospital cleaners cause no demonstrable reduction in the antimicrobial efficacy of these antimicrobial composite articles.

Figure 10A:
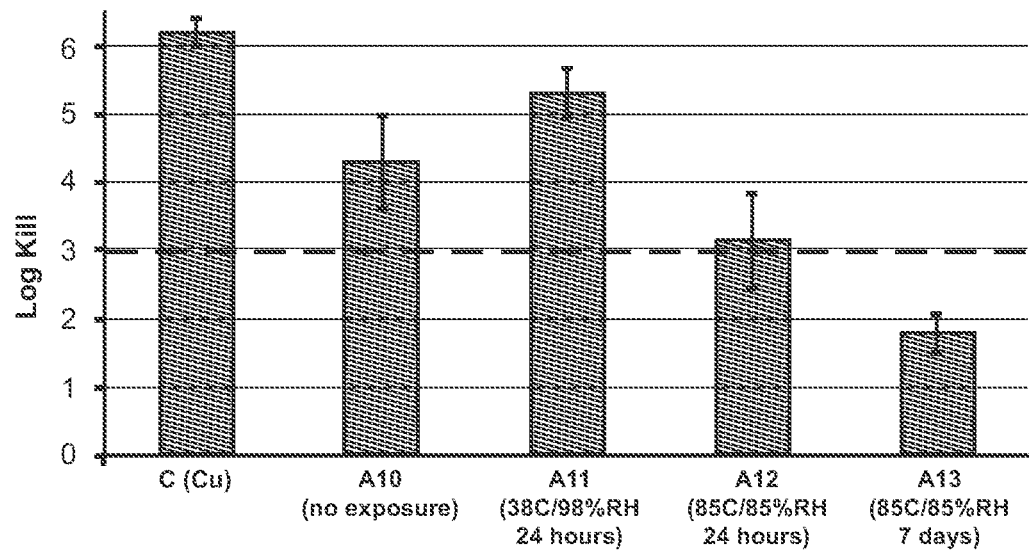
FIGS. 10A & 10B are bar charts depicting the antimicrobial efficacy of antimicrobial composite articles having a polypropylene matrix and a plurality of second phase particles comprising a phase-separable glass with a copper-containing antimicrobial agent, and subjected to various environmental conditions.
Figure 10B:
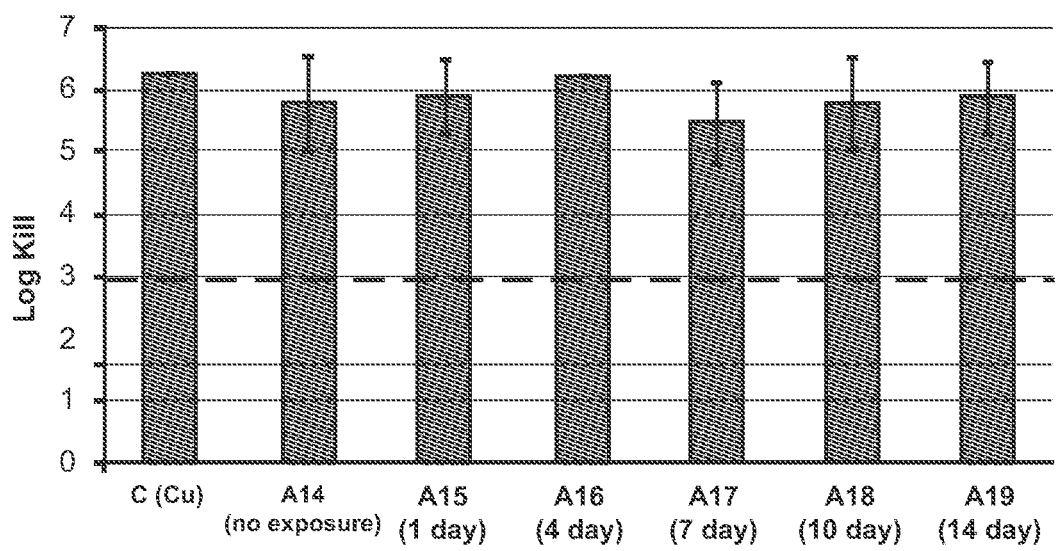

FIGS. 10A & 10B are bar charts depicting the antimicrobial efficacy (as tested with the Modified EPA Copper Test Protocol) of antimicrobial composite articles having a polypropylene matrix and a plurality of second phase particles comprising a phase-separable glass with a copper-containing antimicrobial agent, and subjected to various environmental conditions. In both FIGS. 10A & 10B, the sample group designated "C" is a control sample of pure copper material. In FIG. 10A, sample groups "A10" through "A13" are indicative of antimicrobial composite articles subjected to a mechanical surface removal step (e.g., sanding) and a surface chemistry modification step (e.g., plasma treatment in air), followed by no exposure to an environmental condition (A10) or exposure to various environmental conditions—i.e., 38° C./98% relative humidity for 24 hours (A11), 85° C./85% relative humidity for 24 hours (A12), and 85° C./85% relative humidity for 7 days (A13). Similarly, in FIG. 10B, sample groups "A14" through "A19" are indicative of antimicrobial composite articles subjected to a mechanical surface removal step (e.g., sanding) and a surface chemistry modification step (e.g., plasma treatment in air), followed by no exposure to an environmental condition (A14) or exposure to various environmental conditions—i.e., 38° C./98% relative humidity for 24 hours (A15), 4 days (A16), 7 days (A17), 10 days (A18), and 14 days (A19). As demonstrated by FIGS. 10A & 10B, the addition of the exposure of the antimicrobial composite articles to various environmental conditions involving increased temperature and humidity causes no demonstrable reduction in the antimicrobial efficacy of these antimicrobial composite articles.

Figure 11:
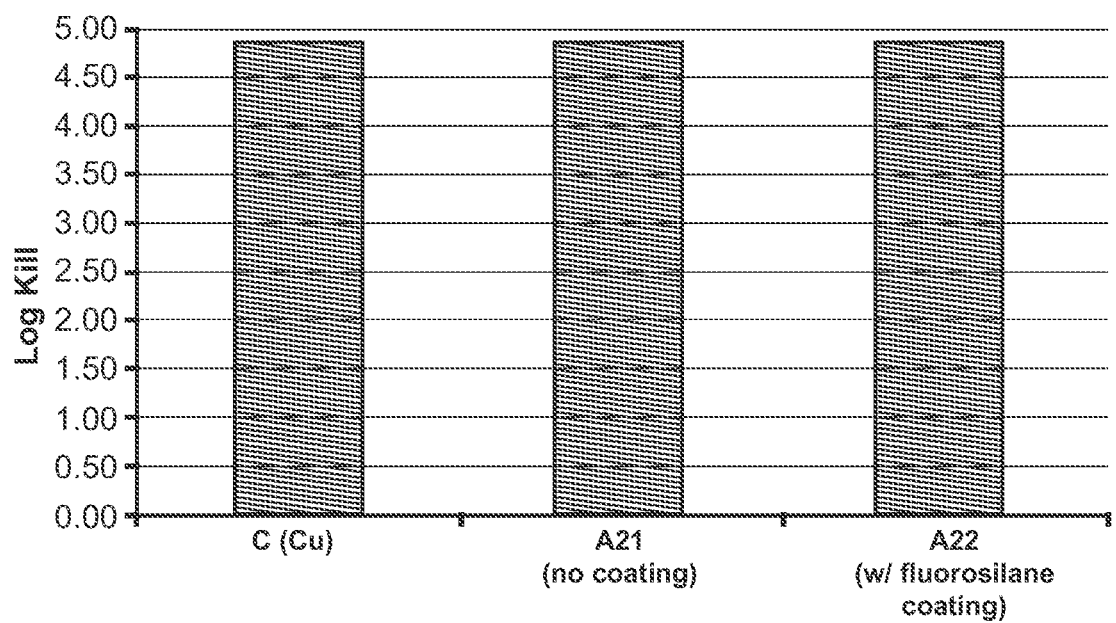
FIG. 11 is a bar chart depicts the antimicrobial efficacy of antimicrobial composite articles having a polypropylene matrix and a plurality of second phase particles comprising a phase-separable glass with a copper-containing antimicrobial agent, with and without a subsequent fluorosilane layer over the exterior surfaces of the article.

Referring to FIG. 11, a bar chart depicts the antimicrobial efficacy (as tested with the Modified EPA Copper Test Protocol) of antimicrobial composite articles having a polypropylene matrix and a plurality of second phase particles comprising a phase-separable glass with a copper-containing antimicrobial agent, with and without a subsequent fluorosilane layer over the exterior surfaces of the article. In FIG. 11, the sample group designated "C" is a control sample of pure copper material. Sample groups "A21" and "A22" are indicative of antimicrobial composite article subjected to a mechanical surface removal step (e.g., sanding) and a surface chemistry modification step (e.g., plasma treatment in air), followed by no additional coating (A21) or an additional fluorosilane coating (A22), e.g., as configured for fingerprint, smudge resistance, scratch resistance or the like. As demonstrated by FIG. 11, the addition of the fluorosilane coating causes no demonstrable reduction in the antimicrobial efficacy of these antimicrobial composite articles.

Aspect (1) of this disclosure pertains to an antimicrobial composite article, comprising: a matrix comprising a polymeric material; and a plurality of second phase particles comprising a phase-separable glass with a copper-containing antimicrobial agent, wherein the plurality of particles is distributed within the matrix at a second phase volume fraction, and further wherein the composite article defines an exterior surface comprising an exposed portion of the matrix and the plurality of the second phase particles.

Aspect (2) of this disclosure pertains to the article of Aspect (1), wherein the exposed portion of the plurality of second phase particles is distributed within the exposed portion of the matrix at a second phase area fraction within ±25% of the second phase volume fraction.

Aspect (3) of this disclosure pertains to the article of Aspect (1) or Aspect (2), wherein the matrix comprises a polymeric material characterized by substantial hydrophobicity, and further wherein the exposed portion of the matrix is characterized by substantial hydrophilicity.

Aspect (4) of this disclosure pertains to the article of any one of Aspect (1) through Aspect (3), wherein the polymeric material is selected from the group consisting of a polypropylene, a polyolefin and a polysulfone.

Aspect (5) of this disclosure pertains to the article of Aspect (1) through Aspect (4), wherein the phase-separable glass comprises at least one of $B_2O_3$, $P_2O_5$ and $R_2O$, and the antimicrobial agent is cuprite comprising a plurality of $Cu^+$ ions.

Aspect (6) of this disclosure pertains to the article of Aspect (1) through Aspect (5), wherein the exterior surface of the article exhibits at least a log 2 reduction in a concentration of at least one of *Staphylococcus aureus, Enterobacter aerogenes*, and *Pseudomonas aeruginosa* bacteria under a Modified EPA Copper Test Protocol.

Aspect (7) of this disclosure pertains to the article of Aspect (1) through Aspect (8), wherein the exterior surface of the article exhibits at least a log 3 reduction in a concentration of at least one of *Staphylococcus aureus,*

*Enterobacter aerogenes*, and *Pseudomonas aeruginosa* bacteria under a Modified EPA Copper Test Protocol.

Aspect (8) of this disclosure pertains to the article of Aspect (5), wherein the plurality of second phase particles has a size distribution defined by a 325 standard US mesh size.

Aspect (9) of this disclosure pertains to the article of Aspect (1) through Aspect (8), wherein the phase-separable glass comprises between about 10 and 50 mol % cuprite.

Aspect (10) of this disclosure pertains to the article of Aspect (1) through Aspect (9), wherein the matrix comprises a polymeric material characterized by substantial hydrophilicity.

Aspect (11) of this disclosure pertains to the article of Aspect (3), wherein the exposed portion of the matrix comprises functional groups derived from a plasma treatment of the matrix.

Aspect (12) of this disclosure pertains to the article of Aspect (1) through Aspect (11), wherein the exterior surface of the composite article is configured as a high touch surface of an element selected from the group consisting of a cover screen for a display device, a housing for a display device, a counter-top, a table-top, a door knob, a rail, and an elevator control panel.

Aspect (13) of this disclosure pertains to a method of making an antimicrobial composite article, comprising the steps: providing a matrix comprising a polymeric material; providing a plurality of second phase particles comprising an antimicrobial agent; melting the matrix to form a matrix melt; distributing the plurality of second phase particles in the matrix melt at a second phase volume fraction to form a composite melt; forming a composite article from the composite melt; and treating the composite article to form an antimicrobial composite article having an exterior surface comprising an exposed portion of the matrix and the plurality of second phase particles.

Aspect (14) of this disclosure pertains to the method of Aspect (13), wherein the matrix comprises a polymeric material characterized by substantial hydrophilicity.

Aspect (15) of this disclosure pertains to the method of Aspect (13) or Aspect (14), wherein the treating step comprises abrading the composite article to form an antimicrobial composite article having an exterior surface comprising an exposed portion of the matrix and the plurality of second phase particles.

Aspect (16) of this disclosure pertains to the method of Aspect (13) through Aspect (15), wherein the matrix comprises a polymeric material characterized by substantial hydrophobicity, and further wherein the exposed portion of the matrix is characterized by substantial hydrophilicity.

Aspect (17) of this disclosure pertains to the method of Aspect (16), wherein the treating step comprises abrading and a plasma-treating the composite article to form an antimicrobial composite article having an exterior surface comprising an exposed portion of the matrix and the plurality of second phase particles.

Aspect (18) of this disclosure pertains to the method of Aspect (17), wherein the abrading is performed before the plasma-treating during the treating step.

Aspect (19) of this disclosure pertains to the method of Aspect (17), wherein the plasma-treating is performed before the abrading during the treating step.

Aspect (20) of this disclosure pertains to the method of any one of Aspect (13) through Aspect (19), wherein the polymeric material is selected from the group consisting of a polypropylene, a polyolefin and a polysulfone.

Aspect (21) of this disclosure pertains to the method of any one of Aspect (13) through Aspect (20), wherein the second phase particles further comprise an $SiO_2$-containing glass and at least one of $B_2O_3$, $P_2O_5$ and $R_2O$, and further wherein the antimicrobial agent is cuprite comprising a plurality of $Cu^{1+}$ ions.

Aspect (22) of this disclosure pertains to the method of any one of Aspect (13) through Aspect (21), wherein the melting and distributing steps comprise an extrusion process and the forming a composite article step comprises an injection molding process.

Aspect (23) of this disclosure pertains to the method of any one of Aspect (13) through Aspect (22), wherein the exterior surface of the antimicrobial composite article exhibits at least a log 2 reduction in a concentration of at least one of *Staphylococcus aureus, Enterobacter aerogenes*, and *Pseudomonas aeruginosa* bacteria under a Modified EPA Copper Test Protocol.

Aspect (24) of this disclosure pertains to the method of any one of Aspect (13) through Aspect (23), wherein the exterior surface of the antimicrobial composite article exhibits at least a log 3 reduction in a concentration of at least one of *Staphylococcus aureus, Enterobacter aerogenes*, and *Pseudomonas aeruginosa* bacteria under a Modified EPA Copper Test Protocol.

Aspect (25) of this disclosure pertains to a method of making an antimicrobial composite article, comprising the steps: providing a matrix comprising a hydrophobic polymeric material; providing a plurality of second phase particles comprising an copper-containing antimicrobial agent; melting the matrix to form a matrix melt; extruding the plurality of second phase particles in the matrix melt at a second phase volume fraction to form a composite melt; injection molding a composite article from the composite melt; and treating the composite article to form an antimicrobial composite article having an exterior surface comprising an exposed portion of the matrix and the plurality of second phase particles, wherein the exposed portion of the plurality of second phase particles is distributed within the exposed portion of the matrix at a second phase area fraction within ±25% of the second phase volume fraction.

It will be apparent to those skilled in the art that various modifications and variations can be made without departing from the spirit or scope of the invention.

What is claimed is:

1. An antimicrobial composite article, comprising:
a matrix comprising a polymeric material; and
a plurality of second phase particles comprising a phase separated glass with a copper-containing antimicrobial agent,
wherein the plurality of particles is distributed within the matrix at a second phase volume fraction, and
further wherein the composite article comprises an exterior surface comprising an exposed portion of the matrix and the plurality of the second phase particles.

2. The article of claim 1, wherein the exposed portion of the plurality of second phase particles is distributed within the exposed portion of the matrix at a second phase area fraction within ±25% of the second phase volume fraction.

3. The article of claim 1, wherein the polymeric material of the matrix is characterized by substantial hydrophobicity, as measured by a contact angle between water and the polymeric material of greater than 90°, and further wherein the exposed portion of the matrix is characterized by substantial hydrophilicity.

4. The article of claim 1, wherein the polymeric material is selected from the group consisting of a polypropylene, a polyolefin and a polysulfone.

5. The article of claim 1, wherein the phase separated glass comprises at least one of $B_2O_3$, $P_2O_5$ and $R_2O$, and the antimicrobial agent is cuprite comprising a plurality of $Cu^{1+}$ ions.

6. The article of claim 1, wherein the exterior surface of the article exhibits at least a log 2 reduction in a concentration of at least one of *Staphylococcus aureus, Enterobacter aerogenes*, and *Pseudomonas aeruginosa* bacteria under a Modified EPA Copper Test Protocol.

7. The article of claim 6, wherein the exterior surface of the article exhibits at least a log 3 reduction in a concentration of at least one of *Staphylococcus aureus, Enterobacter aerogenes*, and *Pseudomonas aeruginosa* bacteria under a Modified EPA Copper Test Protocol.

8. The article of claim 5, wherein the plurality of second phase particles has a size distribution defined by a 325 standard US mesh size.

9. The article of claim 1, wherein the phase separated glass comprises between about 10 and 50 mol % cuprite.

10. The article of claim 1, wherein the matrix comprises a polymeric material characterized by substantial hydrophilicity.

11. The article of claim 3, wherein the exposed portion of the matrix comprises functional groups derived from a plasma treatment of the matrix.

12. The article of claim 1, wherein the exterior surface of the composite article is configured as a high touch surface of an element selected from the group consisting of a cover screen for a display device, a housing for a display device, a counter-top, a table-top, a door knob, a rail, and an elevator control panel.

* * * * *

UNITED STATES PATENT AND TRADEMARK OFFICE
CERTIFICATE OF CORRECTION

PATENT NO. : 10,959,434 B2
APPLICATION NO. : 15/769943
DATED : March 30, 2021
INVENTOR(S) : Dayue Jiang et al.

Page 1 of 1

It is certified that error appears in the above-identified patent and that said Letters Patent is hereby corrected as shown below:

On the Title Page

On page 2, in Column 2, item (56), Other Publications, Line 3, delete "2014." and insert -- 2014; SP14-036 --, therefor.

Signed and Sealed this
Twenty-seventh Day of September, 2022

Katherine Kelly Vidal
*Director of the United States Patent and Trademark Office*